(12) United States Patent
Kume et al.

(10) Patent No.: US 7,034,784 B2
(45) Date of Patent: Apr. 25, 2006

(54) OPTICAL SHIFTER AND OPTICAL DISPLAY SYSTEM

(75) Inventors: Yasuhiro Kume, Kawachinagano (JP); Takashi Kurihara, Ikoma (JP); Hiroshi Nakanishi, Yawata (JP)

(73) Assignee: Sharp Kabushiki Kaisha, Osaka (JP)

( * ) Notice: Subject to any disclaimer, the term of this patent is extended or adjusted under 35 U.S.C. 154(b) by 360 days.

(21) Appl. No.: 10/284,202

(22) Filed: Oct. 31, 2002

(65) Prior Publication Data

US 2003/0095092 A1 May 22, 2003

(30) Foreign Application Priority Data

| Nov. 22, 2001 | (JP) | ............................. 2001-358196 |
| May 29, 2002 | (JP) | ............................. 2002-155106 |
| Sep. 20, 2002 | (JP) | ............................. 2002-275922 |

(51) Int. Cl.
*G09G 3/36* (2006.01)

(52) U.S. Cl. ............................. 345/87; 345/4; 349/71

(58) Field of Classification Search .................. 345/87, 345/98, 7–9, 32, 4; 349/84, 95, 71, 124
See application file for complete search history.

(56) References Cited

U.S. PATENT DOCUMENTS

| 4,984,091 A | 1/1991 | Murata |
| 5,161,042 A | 11/1992 | Hamada |
| 5,414,541 A | 5/1995 | Patel et al. |
| 5,969,832 A | 10/1999 | Nakanishi et al. |
| 6,061,103 A | 5/2000 | Okamura et al. |
| 6,211,944 B1 * | 4/2001 | Shiraishi ...................... 355/53 |
| 6,798,468 B1 * | 9/2004 | Iijima ........................... 349/61 |
| 2002/0030777 A1 * | 3/2002 | Noguchi et al. ............. 349/123 |
| 2002/0047958 A1 * | 4/2002 | Hirata et al. ................. 349/106 |
| 2002/0130999 A1 * | 9/2002 | Kim et al. ................... 349/124 |
| 2002/0154256 A1 * | 10/2002 | Gotoh et al. ................... 349/65 |
| 2003/0090611 A1 * | 5/2003 | Janssen ....................... 349/137 |

FOREIGN PATENT DOCUMENTS

| JP | 1-191123 A | 8/1989 |
| JP | 10-206881 A | 8/1998 |

OTHER PUBLICATIONS

U.S. National Stage Patent Application based on PCT/JP01/05041 filed Dec. 16, 2002 entitled "Projection Type Image Display Device".

(Continued)

*Primary Examiner*—Amr A. Awad
*Assistant Examiner*—Kimnhung Nguyen
(74) *Attorney, Agent, or Firm*—Nixon & Vanderhye P.C.

(57) ABSTRACT

An optical shifter includes at least one shifting section that periodically displaces the optical axis of incoming linearly polarized light. The shifting section includes first and second liquid crystal cells and a birefringent element. Each of the liquid crystal cells changes the polarization direction of the incoming light from a first direction into a second direction, or vice versa, responsive to a voltage being applied to the cell. The first and second directions are perpendicular to each other. The birefringent element changes its refractive indices with the polarization direction of the light incident thereon. The first and second cells and the birefringent element are arranged to transmit the incoming light in this order. The liquid crystal layer of the second cell compensates for a disturbance in polarization that was caused while the incoming linearly polarized light was transmitted through the liquid crystal layer of the first cell.

24 Claims, 13 Drawing Sheets

OTHER PUBLICATIONS

Taiwanese Office Action and partial English translation mailed Mar. 25, 2004 in corresponding Taiwanese application No. 091132457.

Korean Notice of Rejection and English translation thereof mailed Aug. 26, 2004 in corresponding Korean Application No. 10-2002-0072984.

* cited by examiner

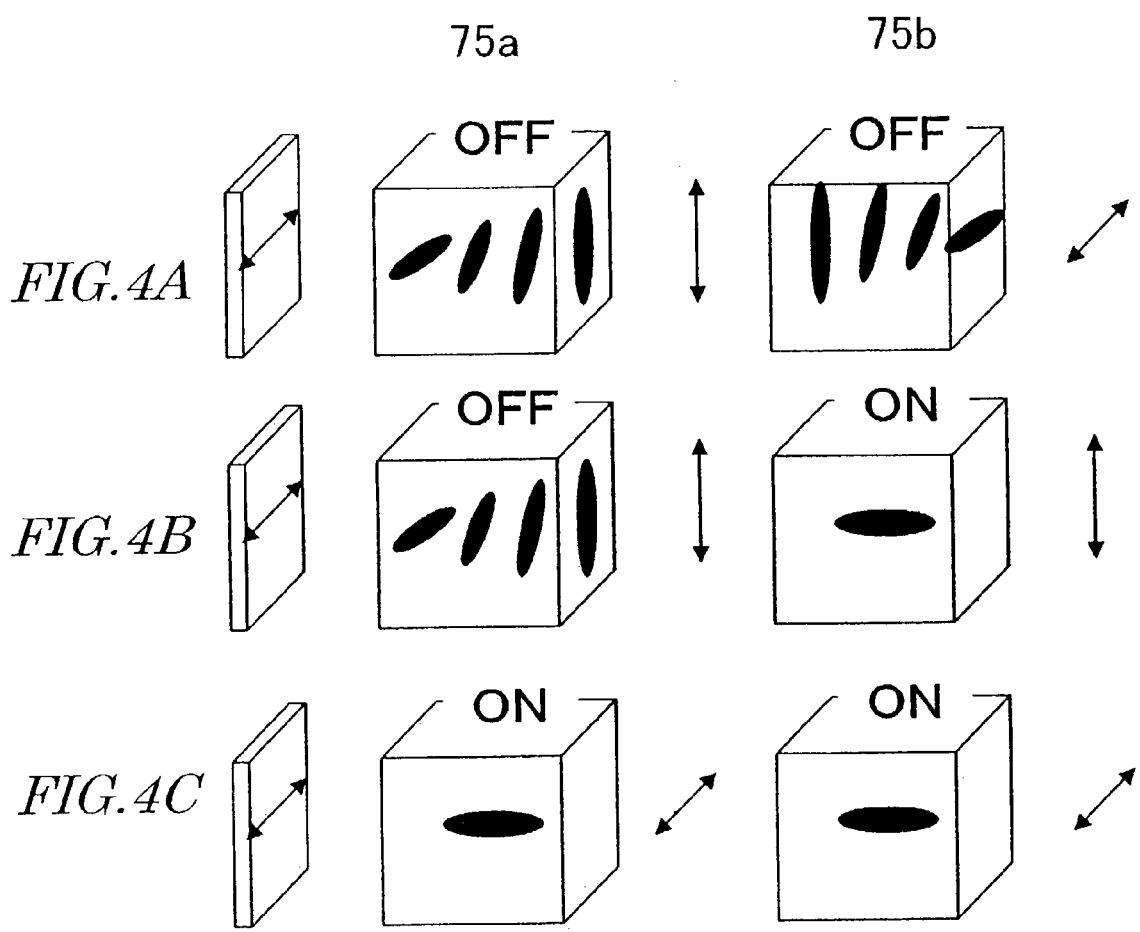

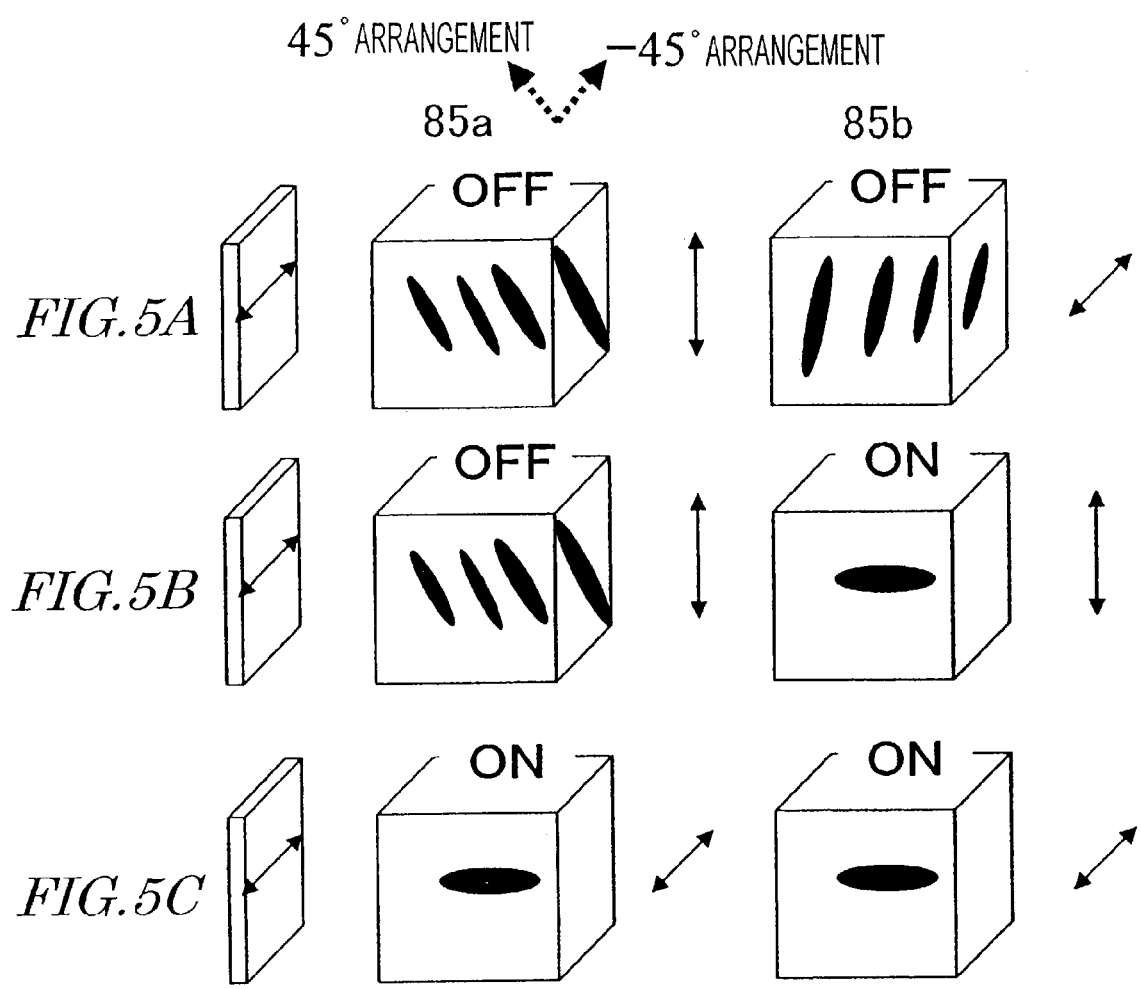

OPTICAL SHIFTER AND OPTICAL DISPLAY SYSTEM

BACKGROUND OF THE INVENTION

1. Field of the Invention

The present invention relates to an optical shifter that can be used to physically shift, displace, or change the location at which an optical output signal is presented to another location in a head mounted display (HMD) or a projection type display system (i.e., projector) and also relates to an optical display system including such an optical shifter.

2. Description of the Related Art

A liquid crystal display (LCD) includes a pair of substrates and a liquid crystal layer that is sandwiched between the substrates. Multiple pixel electrodes are regularly arranged in columns and rows (i.e., in matrix) on one of the two substrates. A drive voltage, representing an image signal, is applied to each of the pixel electrodes. The optical properties of the liquid crystal layer change on a pixel-by-pixel basis upon the application of this voltage. Thus, an image, character and so on can be displayed on the LCD.

The methods of applying different drive voltages to the respective pixel electrodes on the substrate independently include a "simple-matrix addressing" method and an "active-matrix addressing" method.

In the active-matrix addressing method, multiple switching elements are provided for the respective pixel electrodes on the substrate. A substrate including those switching elements thereon is normally called an "active-matrix substrate". On the active-matrix substrate, each of those switching elements selectively turns ON or OFF to electrically connect or disconnect its associated pixel electrode to/from its associated signal line. A metal-insulator-metal (MIM) element or thin-film transistor (TFT) may be used effectively as such a switching element.

In its OFF state, the switching element needs to have the highest possible electrical resistance. However, if the switching element in OFF state is exposed to intense radiation, then the electrical resistance of the switching element decreases to generate leakage current. As a result, the electrical charge that has been stored in its associated pixel electrode is lost partially. Also, in that case, a drive voltage at an appropriate level cannot be applied to the pixel electrode. Then, the LCD cannot conduct the display operation as intended. For example, even in its black display mode, the LCD leaks some light unintentionally to decrease the resultant contrast ratio thereof.

In an LCD of a transmission type, an opaque layer, which is often called a "black matrix", is provided either over the active-matrix substrate or over a counter substrate, which faces the active-matrix substrate by way of the liquid crystal layer, to overcome these problems. However, when the black matrix is provided, the aperture ratio (i.e., the ratio of the total transmitting area to the overall display area) of pixels decreases adversely. To increase the definition sufficiently by reducing the total area of the black matrix, the switching elements or interconnection lines may be downsized. In that case, however, the driving force may decrease or the wiring resistance may increase. Furthermore, it is currently difficult to further reduce the sizes of the switching elements or interconnection lines considering various constraints on the actual manufacturing process of LCDs.

A technique of optically shifting or displacing the image by a distance that is approximately equal to a pixel pitch for the purpose of increasing the screen resolution by utilizing the non-display areas on the black matrix is disclosed in U.S. Pat. No. 4,984,091. According to this technique, as the pixels are shifted, an image displayed is also shifted to a location corresponding to the pixels shifted. Thus, the apparent number of pixels increases, and therefore, even a low-resolution display panel can also display an image having a definition comparable to that of a high-resolution display panel.

U.S. Pat. No. 6,061,103 discloses a method of getting each set of three pixels, representing the three primary colors of red (R), green (G) and blue (B) (which will be herein referred to as "R, G and B pixels", respectively), displaced optically by an optical shifter one after another and then displaying a superimposed, composite image consisting of three image components represented by the three types of pixels shifted. In this method, the R, G and B pixels are displayed in an area corresponding to one pixel by a time-sequential technique. Accordingly, the apparent resolution can be tripled without reducing the pixel pitch on the display panel.

U.S. Pat. No. 6,061,103 also discloses an optical shifter, including a liquid crystal cell and a birefringent element in combination, as a means for displacing the image optically. The birefringent element is made of a material that refracts incoming light in a different direction depending on the polarization direction of the incoming light. Thus, if the polarization direction of the light that is going to enter the birefringent element has been changed by the liquid crystal cell, then the optical axis of the light (i.e., propagation direction of the light) that is leaving the birefringent element can be shifted.

FIG. 1 illustrates a known optical shifter. As shown in FIG. 1, this optical shifter includes a liquid crystal cell 7 and a birefringent element 11, which are arranged in series in the direction in which incoming light is propagated. The liquid crystal cell 7 may switch from the state of rotating the plane of the electric vector of incoming linearly polarized light (which will be herein referred to as the "plane of polarization") by 90 degrees to the state of transmitting the incoming linearly polarized light as it is without rotating the plane of polarization thereof at all, or vice versa. The birefringent element 11 can shift the incoming light in accordance with the direction of the plane of polarization of the incoming linearly polarized light.

In the example illustrated in FIG. 1, the direction of the electric vector (i.e., the polarization direction) of the light that is going to enter the liquid crystal cell 7 is the direction coming out of the paper. The liquid crystal cell 7 uses a twisted nematic mode liquid crystal material (which will be herein referred to as a "TN mode liquid crystal material") with positive refractive index anisotropy $\Delta\epsilon$. Accordingly, while no voltage is being applied to the liquid crystal layer of the liquid crystal cell 7 (which state will be herein referred to as a "voltage-OFF state"), the liquid crystal molecules thereof are twisted by 90 degrees. Due to the optical rotatory property of the liquid crystal molecules, the plane of polarization of the incoming light is rotated by 90 degrees. On the other hand, while a voltage that is equal to or higher than a predetermined level is being applied to the liquid crystal layer of the liquid crystal cell 7 (which state will be herein referred to as a "voltage-ON state"), the orientation directions of the liquid crystal molecules are aligned with the direction of the electric field generated. Accordingly, the incoming light goes out of the liquid crystal cell 7 without getting its plane of polarization rotated by the liquid crystal molecules. That is to say, the plane of polarization of the outgoing light still crosses the paper at right angles. Then, the birefringent element 11 directly transmits the light with the plane of polarization crossing the paper at right angles but refracts, or shifts, the light with the plane of polarization parallel to the paper.

In the optical shifter shown in FIG. 1, the liquid crystal cell 7 thereof needs to be switched appropriately and quickly from the state of passing, or transmitting, the first linearly polarized light into the state of letting go the second linearly polarized light, having a plane of polarization that crosses that of the first linearly polarized light at right angles, or vice versa, depending on the magnitude of the voltage applied thereto.

As described above, in a liquid crystal cell made of a TN mode liquid crystal material, while no voltage is being applied to the TN mode liquid crystal material, incoming linearly polarized light goes out of the liquid crystal cell as linearly polarized light that has had its plane of polarization rotated by 90 degrees. However, when a voltage is applied to the TN mode liquid crystal material, the orientation directions of the liquid crystal molecules change quickly responsive to the electric field generated. As a result, the liquid crystal layer soon enters the state of not changing the polarization direction of the incoming light. If the voltage that has been applied to the TN mode liquid crystal material is stopped, the liquid crystal molecules recover their original state (i.e., relaxed) but the response speed is not so fast.

Thus, depending on whether the voltage applied to the liquid crystal layer is increased from Low level (typically 0 volts) to High level (typically 10 volts) or decreased from High to Low, the orientation directions of the liquid crystal molecules change at different speeds. That is to say, the liquid crystal molecules have different response speeds in these two situations. To estimate this response speed, a pair of polarizers may be disposed in front of and behind the liquid crystal layer so that their axes cross each other at right angles, and a variation in the transmittance of the liquid crystal layer with time may be measured. FIG. 2 is graph showing how the transmittance of the liquid crystal layer changes if the voltage applied thereto is decreased from High to Low level a predetermined time after the voltage was increased from Low to High level. A time it takes for the transmittance of the liquid crystal layer to decrease from its maximum value to zero will be herein referred to as a "liquid crystal fall response time $\tau$ d" while a time it takes for the transmittance to increase from zero to the maximum value will be herein referred to as a "liquid crystal rise response time $\tau$ r". As shown in FIG. 2, the liquid crystal rise response time $\tau$ r is relatively short but the liquid crystal fall response time $\tau$ d is relatively long. If the liquid crystal fall response time $\tau$ d is long, then the image cannot be shifted synchronously with the switching of image components to be displayed on a display panel. Before this problem is described fully, an image switching rate of a display panel will be described.

Normally, a display panel is driven either by an interlacing scanning technique or a noninterlacing scanning technique. In the interlacing scanning, odd-numbered and even-numbered lines are alternately selected on a field-by-field basis. That is to say, if odd-numbered lines are selected for one field (or subframe) of an image, then even-numbered lines are selected for the next field of the image. In this manner, one complete image (or picture), obtained by combining the odd-numbered field and the even-numbered field with each other, is presented on the display. According to this method, each field is normally selected for about 16.6 ms (i.e., at a refresh rate of about 60 Hz). In the noninterlacing scanning on the other hand, multiple lines of the image are sequentially selected one after another, no matter whether the line selected is odd-numbered or even-numbered. As in the interlacing scanning method, each field is also normally selected for about 16.6 ms (i.e., at a refresh rate of about 60 Hz). As used herein, "one field period" refers to one vertical sync period of an image, no matter whether the scanning method adopted is interlacing or noninterlacing. In an LCD, one field period corresponds to a scan period including the blanking interval.

According to the method disclosed in U.S. Pat. No. 6,061,103 identified above, one field period is divided into three subfield periods for the three locations to which the R, G and B pixels are shifted, and three different components of one image (which will be herein referred to as "image subfields" or "subfields" simply) are sequentially presented on the display panel in those three subfield periods. In that case, one subfield period is about 5 ms. Thus, the optical shifter needs to optically displace those image components (or subfields) at as short time intervals as about 5 ms. Furthermore, the shifting of the subfields by the optical shifter should be timed (or synchronized) with the switching of the same subfields on the display panel. Accordingly, no sooner have the subfields been switched on the display panel than the optical shifter must change its states responsive to the voltage applied to the liquid crystal cell.

Actually, though, it is difficult for any liquid crystal cell currently available to change its states quickly enough responsive to the voltage applied thereto. In a liquid crystal cell made of the TN mode liquid crystal material, for example, the liquid crystal rise response time $\tau$ r thereof is relatively short but the liquid crystal fall response time $\tau$ d thereof is normally about 10+ ms, which is much longer than one subfield period of about 5 ms, as shown in FIG. 2.

Such a difference in response time is created for the following reasons. Specifically, as shown in FIG. 2, the transmittance is increased by applying a voltage to the liquid crystal layer such that the orientation directions of the liquid crystal molecules are aligned with one direction upon the application of the external energy (i.e., the voltage). On the other hand, the transmittance is decreased by stopping the application of the voltage to the liquid crystal layer so that the liquid crystal molecules recover their original orientation states by themselves.

If the liquid crystal material adopted has such a long fall response time $\tau$ d, then the polarization directions cannot be switched appropriately, either. This problem will be further described with reference to FIG. 1. As shown in FIG. 1, if the voltage applied to the liquid crystal layer of the liquid crystal cell 7 is changed from ON state into OFF state, then the plane of polarization of the light going out of the liquid crystal cell 7 rotates by 90 degrees. As a result, the optical axis of the light that is leaving the birefringent element 11 shifts from the location B to the location A. In this case, if the fall response time $\tau$ d of the liquid crystal material is too long, then the linearly polarized light changes into elliptically polarized light while the liquid crystal molecules are falling. Thus, the same image component will be displayed at both of the two locations A and B and a ghost image will be presented during the interval. Consequently, the resolution of the image decreases.

Also, if there is a big difference between the rise and fall response times $\tau$ r and $\tau$ d of the liquid crystal material, then the intensity of the ghost image that is produced during the optical shifting of the image from the location A to the location B becomes different from that of the ghost image produced during the optical shifting from the location B to the location A. As a result, a quite perceivable flicker is produced.

Japanese Laid-Open Publication No. 1-191123 discloses an optical shutter that includes dextrorotatory and levorotatory TN mode liquid crystal materials in combination. This optical shutter can be activated at a relatively high rate but cannot be used as an optical shifter. The reason is as follows. The optical shifter needs to shift one of multiple image subfields after another synchronously with switching of those subfields on the display panel, whereas the optical shutter cannot display the subfields continuously because the optical shutter temporarily blocks the optical path mechanically during the operation thereof. That is to say, the optical shutter temporarily suspends the display of one of those subfields during the subfield period thereof.

SUMMARY OF THE INVENTION

In order to overcome the problems described above, preferred embodiments of the present invention provide an optical shifter that can substantially eliminate the ghost image even if the response of a liquid crystal material to the removal of the voltage applied is not so fast and provide an optical display system including such an optical shifter.

An optical shifter according to a preferred embodiment of the present invention preferably includes at least one shifting section that periodically displaces the optical axis of incoming linearly polarized light that has been incident on the shifting section. The shifting section preferably includes a first liquid crystal cell, a second liquid crystal cell and a birefringent element. The first liquid crystal cell preferably changes the polarization direction of the incoming light from a first direction into a second direction, or vice versa, in response to a first voltage being applied to a liquid crystal layer of the first liquid crystal cell, where the first and second directions are perpendicular to each other. The second liquid crystal cell preferably changes the polarization direction of the light that has been transmitted through the liquid crystal layer of the first liquid crystal cell from the first direction into the second direction, or vice versa, in response to a second voltage being applied to a liquid crystal layer of the second liquid crystal cell. The birefringent element preferably shifts the optical axis of the light that has been transmitted through the second liquid crystal cell. The liquid crystal layer of the second liquid crystal cell preferably compensates for a disturbance in polarization that was caused while the incoming linearly polarized light was transmitted through the liquid crystal layer of the first liquid crystal cell.

In the optical shifter according to this preferred embodiment of the present invention, even if an elliptically polarized component has been produced due to the wavelength dispersion of the liquid crystal layer of the first liquid crystal, the liquid crystal layer of the second liquid crystal cell changes the polarization state (including rotation of the plane of polarization) and thereby cancels the unwanted elliptically polarized component. This is because the liquid crystal layer of the second cell is disposed so as to satisfy an appropriate relationship with that of the first cell. That is to say, the orientation direction of the liquid crystal molecules in the first cell and that of the liquid crystal molecules in the second cell define an angle that falls within a predetermined range. Thus, desired linearly polarized light, having no elliptically polarized components over a broad visible radiation range, is incident on the birefringent element and no ghost image is produced.

In one preferred embodiment of the present invention, the first and second liquid crystal cells are preferably disposed such that a director in an intermediate portion of the liquid crystal layer of the first liquid crystal cell and a director in an intermediate portion of the liquid crystal layer of the second liquid crystal cell cross each other at right angles.

In this particular preferred embodiment, the liquid crystal layers of the first and second liquid crystal cells may be made of two different types of TN mode liquid crystal materials having mutually opposite optical rotatory directions.

Alternatively, the liquid crystal layers of the first and second liquid crystal cells may be made of ECB mode liquid crystal materials. When the two liquid crystal layers of the ECB mode liquid crystal materials are disposed in parallel to each other, the orientation directions (or the directors) of the liquid crystal molecules in those liquid crystal layers are controllable with the levels of the applied voltages. That is to say, by selectively applying a high or low voltage to each of the liquid crystal layers, the incoming linearly polarized light is transmitted through the liquid crystal layer either as it is or after having had its polarization state changed by the liquid crystal layer.

In another preferred embodiment of the present invention, an angle of 42 degrees to 45 degrees is preferably defined between a director in an intermediate portion of the liquid crystal layer of the first liquid crystal cell and a director in an intermediate portion of the liquid crystal layer of the second liquid crystal cell. A bisector that divides the angle into two equal parts preferably defines an angle of about 45 degrees with the polarization direction of the incoming light that enters the first liquid crystal cell.

In this particular preferred embodiment, at least one of the two liquid crystal layers of the first and second liquid crystal cells is preferably made of an ECB mode liquid crystal material.

More particularly, the at least one liquid crystal layer that is made of the ECB mode liquid crystal material preferably has a retardation of 220 nm to 280 nm while no voltage is applied to the liquid crystal layer. A retardation value that falls within the range of 220 nm to 280 nm is approximately half as long as the center wavelength of the visible radiation range. Accordingly, while no voltage is being applied thereto, the ECB mode liquid crystal layer can function as a half-wave plate with respect to an incoming light ray having that wavelength (i.e., a green ray). Thus, when the orientation directions (or directors) of the liquid crystal molecules are defined as in the preferred embodiments of the present invention, the plane of polarization of the incoming light can be rotated appropriately.

In still another preferred embodiment, the optical shifter may further include at least one more shifting section that has the same structure and function as the shifting section. In such a preferred embodiment in which the optical shifter includes multiple shifting sections, the image (or pixel) can be shifted to three or more locations that are arranged in line. Also, if the shifting directions of the shifting sections are controlled appropriately, the image (or pixel) may also be shifted two-dimensionally within a virtual plane (e.g., on a projection plane).

An optical shifter module according to another preferred embodiment of the present invention preferably includes: the optical shifter according to any of the preferred embodiments of the present invention described above; and a driver circuit for applying the first and second voltages to the first and second liquid crystal cells, respectively. When such an optical shifter module is combined with a display panel (e.g., an LCD panel), the resultant optical display system can display an image of quality with the resolution increased significantly.

In one preferred embodiment of the present invention, the driver circuit preferably increases only one of the first and second voltages from a low level to a high level synchronously with switching of image components to be shifted. By controlling the voltages to be applied to the liquid crystal layers synchronously with a subfield switching.

In this particular preferred embodiment, the driver circuit preferably increases both of the first and second voltages to the high level when subfields are switched, and then decreases both of the first and second voltages to the low level during a subfield.

An optical display system according to still another preferred embodiment of the present invention preferably includes: a display panel to display an image thereon; and the optical shifter according to any of the preferred embodiments of the present invention described above. Light that has gone out of the display panel is preferably shifted by the optical shifter while the image is being displayed on the display panel. The optical display system of the present invention includes the optical shifter of the present invention and can display an image of quality with the resolution increased significantly and almost without producing any ghost image.

In one preferred embodiment of the present invention, the optical display system preferably further includes a driver circuit for applying the first and second voltages to the first and second liquid crystal cells, respectively.

In this particular preferred embodiment, the driver circuit preferably increases only one of the first and second voltages from a low level to a high level.

Alternatively, the driver circuit may increase both of the first and second voltages to the high level and then decrease both of the voltages to the low level before the image displayed on the display panel is switched into another image.

In still another preferred embodiment, the light that has gone out of the display panel and then enters the optical shifter is preferably linearly polarized light. If the light to be incident on the optical shifter of the present invention was elliptically polarized light, even the optical shifter of the present invention could not eliminate the ghost images completely. For that reason, the light to be incident onto the optical shifter is preferably linearly polarized light that has few elliptically polarized components over the broad visible radiation range.

In yet another preferred embodiment, when the image is shifted, each pixel of the image is preferably divided into a predetermined number of color pixels by a time-division technique and then the color pixels are preferably superimposed one upon the other time-sequentially. In this manner, a full-color image can be displayed as a time-sequential image.

Another optical display system according to yet another preferred embodiment of the present invention preferably includes a light source, a display panel, light control means and an optical system. The light source preferably emits light. The display panel preferably includes multiple pixel regions, each of which is able to modulate the light that has been incident thereon. The light control means preferably converges the light, emitted from the light source, onto one of the multiple pixel regions that is associated with the wavelength of the light. The optical system preferably forms an image on a projection plane by projecting the light that has been modulated by the display panel onto the plane. The optical display system preferably further includes a circuit for generating data representing multiple subframes from data representing a frame of the image and getting the multiple subframes displayed on the display panel one after another time-sequentially. The optical display system preferably further includes the optical shifter according to any of the preferred embodiments of the present invention described above. The optical shifter preferably displaces optically, on the projection plane, selected ones of the multiple subframes being displayed on the display panel. The same area on the projection plane is preferably irradiated sequentially with light rays that fall within mutually different wavelength ranges and that have been modulated by mutually different ones of the pixel regions of the display panel.

Yet another preferred embodiment of the present invention provides a method of driving the optical shifter according to any of the preferred embodiments of the present invention described above. The method preferably includes the steps of: increasing only one of the first and second voltages from a low level to a high level at a time when a pair of image components to be shifted is switched; increasing only one of the first and second voltages from a low level to a high level at a time of a subfield switching; increasing only the other one of the first and second voltages from the low level to the high level at a time of another subfield switching; and decreasing both of the first and second voltages from the high level to the low level during a subfield.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIGS. 4A through 4C schematically illustrate the operation of the liquid crystal cells in an optical shifter according to a preferred embodiment of the present invention.

FIGS. 5A through 5C schematically illustrate the operation of the liquid crystal cells in another optical shifter according to another preferred embodiment of the present invention.

FIGS. 8A and 8B schematically illustrate how the resolution of an image is increased by the optical shifter shown in FIG. 6B wherein:

FIG. 8A illustrates an image on which the optical shifter is not operating; and

FIG. 8B illustrates an image on which the optical shifter is operating.

DETAILED DESCRIPTION OF PREFERRED EMBODIMENTS

Figure 3:
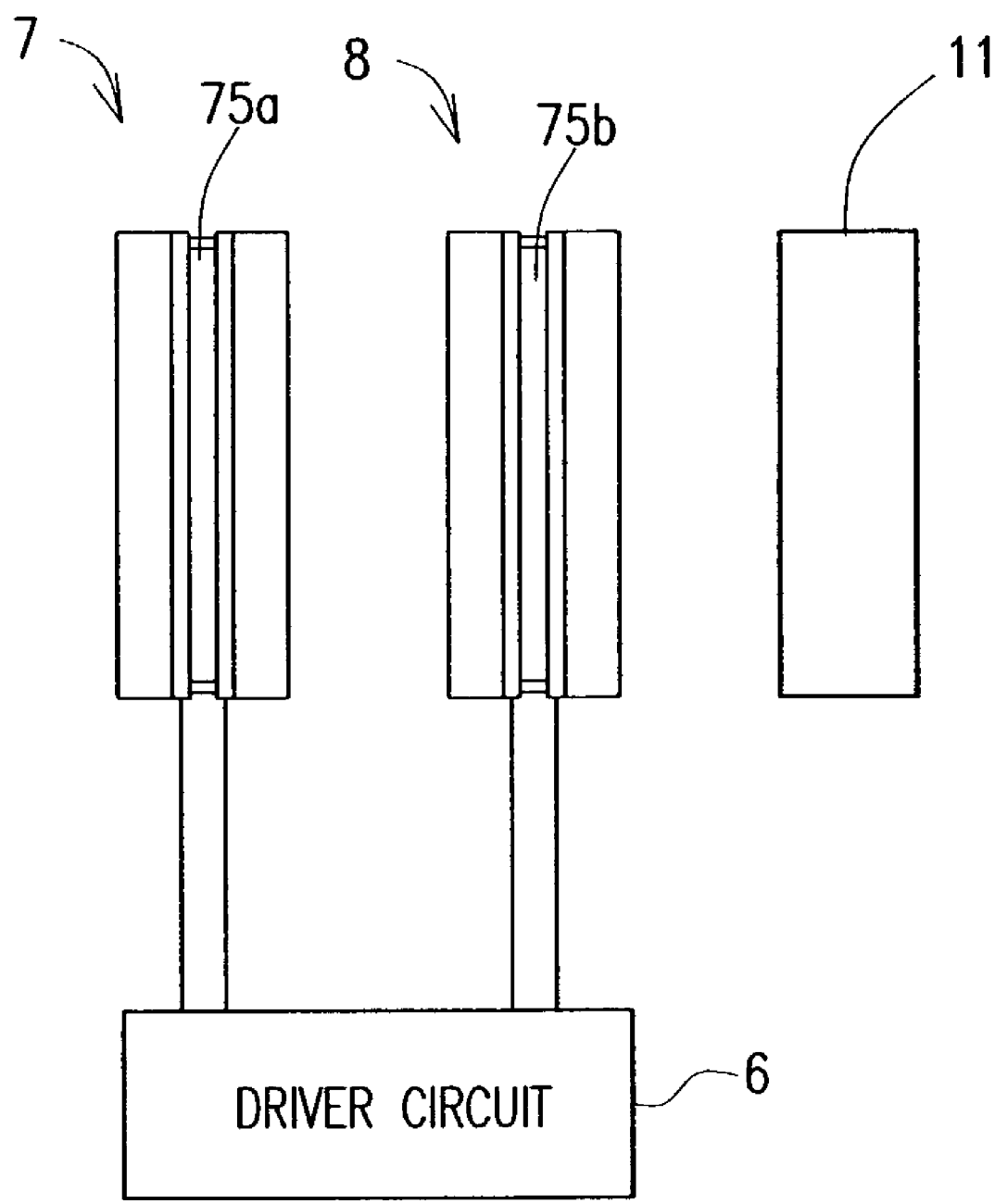
FIG. 3 is a cross-sectional view showing a basic configuration for an optical shifter module according to any of various preferred embodiments of the present invention.

An optical shifter according to a preferred embodiment of the present invention includes at least one shifting section that periodically displaces the optical axis of incoming linearly polarized light that has been incident on the shifting section. As shown in FIG. 3, the shifting section includes a first liquid crystal cell 7, a second liquid crystal cell 8 and a birefringent element 11. The first liquid crystal cell 7 can change the polarization direction of the incoming light from one of two mutually perpendicular directions into the other depending on whether the voltage being applied from a driver circuit 6 to the first liquid crystal cell 7 is high or low. Just like the first liquid crystal cell 7, the second liquid crystal cell 8 can also change the polarization direction of the incoming light from one of the two mutually perpendicular directions into the other depending on whether the voltage being applied from the driver circuit 6 to the second liquid crystal cell 8 is high or low.

The first liquid crystal cell 7, second liquid crystal cell 8 and birefringent element 11 are arranged so as to transmit the incoming light in this order. The first and second liquid crystal cells 7 and 8 are disposed such that a director (i.e., a vector representing the orientation direction of liquid crystal molecules) in an intermediate portion of the liquid crystal layer 75a of the first liquid crystal cell 7 and a director in an intermediate portion of the liquid crystal layer 75b of the second liquid crystal cell 8 cross each other at right angles. As used herein, the "intermediate portion" of a liquid crystal layer refers to a portion of the liquid crystal layer that is located around the center of the thickness of the liquid crystal layer.

In the prior art, an optical shifter includes one liquid crystal cell and one birefringent element. In that case, since the liquid crystal layer of the liquid crystal cell has wavelength dependence or dispersion, the light that has gone out of the liquid crystal cell has both horizontally and vertically polarized components, thus possibly producing a ghost image. In contrast, in the optical shifter according to this preferred embodiment of the present invention, a pair of liquid crystal cells 7 and 8, the directors of which cross each other at right angles, is disposed in front of the birefringent element 11. Thus, the unwanted polarized components that are produced in one of the two liquid crystal layers are canceled by the polarized components that are produced in the other liquid crystal layer. In this manner, such a disturbance in polarization can be compensated for. As a result, desired linearly polarized light can be obtained and the ghost image can be substantially eliminated.

Those unwanted polarized components can also be canceled during the state transition of the liquid crystal molecules while the voltages applied by the driver circuit 6 are decreasing from the high level into the low level simultaneously.

Hereinafter, it will be described with reference to FIGS. 4A through 4C and the following Table 1 why those unwanted polarized components are canceled. FIGS. 4A through 4C illustrate a structure in which a dextrorotatory TN liquid crystal layer 75a and a levorotatory TN liquid crystal layer 75b are disposed in front of the birefringent element (not shown in FIGS. 4A through 4C). The linearly polarized light, which has gone out of the display panel, is transmitted through the two liquid crystal layers 75a and 75b in this order and then incident onto the birefringent element (not shown in FIGS. 4A through 4C).

TABLE 1

| LC layer 75a (dextrorotatory) (phase difference; voltage) | LC layer 75b (levorotatory) (phase difference; voltage) | Total Phase Difference | Outgoing Polarized Component |
|---|---|---|---|
| 4A +π; OFF | −π; OFF | 0 | Horizontal or vertical |
| 4B +π; OFF | 0; ON | +π | Vertical or Horizontal |
| 4C 0; ON | 0; ON | 0 | Horizontal or vertical |

First, the state shown in FIG. 4A will be described. In this state, the voltages being applied to the two liquid crystal layers 75a and 75b are low and the liquid crystal layers 75a and 75b are in OFF state. Then, the phase difference created by the first liquid crystal layer 75a is +π while the phase difference created by the second liquid crystal layer 75b is −π. Accordingly, the total phase difference of the polarized light that has been transmitted through these two liquid crystal layers 75a and 75b is zero. Thus, supposing the polarized light that entered the first liquid crystal layer 75a from the left-hand side thereof had a horizontal plane of polarization, the polarized light that has gone out of the second liquid crystal layer 75b also has a horizontal plane of polarization.

As used herein, where the light that has been transmitted through a liquid crystal layer may be in one of two mutually different states (i.e., a plane of polarization of the outgoing light in one state may cross that of the outgoing light in the other state at right angles) depending on whether the voltage being applied to the liquid crystal layer is high or low, the liquid crystal layer (or liquid crystal cell) to which the high voltage is being applied and which is ready to output predetermined linearly polarized light is regarded as being "in ON state". On the other hand, if the magnitude (or absolute value) of the voltage applied to the liquid crystal layer is much smaller than that of the voltage that needs to be applied to turn the liquid crystal layer ON and if polarized light having a plane of polarization, which substantially crosses that of the polarized light outgoing from the ON-state liquid crystal layer at right angles, is going out of the liquid crystal layer, the liquid crystal layer (or liquid crystal cell) is herein regarded as being "in OFF state".

To "turn OFF" the liquid crystal layer, the low voltage to be applied to the liquid crystal layer may be decreased to zero volts. Alternatively, the liquid crystal layer may also be "turned OFF" by being supplied with a non-zero voltage (e.g., 2.5 volts) as an offset voltage.

As used herein, the "high voltage" applied is a voltage that is high enough to "turn ON" the liquid crystal layer, while the "low voltage" applied is a voltage that is low enough to "turn OFF" the liquid crystal layer. If a TN mode liquid crystal material having positive refractive index anisotropy $\Delta\epsilon$ is used, then the liquid crystal molecules are aligned with the direction of the electric field while the liquid crystal layer is in "ON state", but are twisted by about 90 degrees while the liquid crystal layer is in "OFF state". On the other hand, if a TN mode liquid crystal material having negative refractive index anisotropy $\Delta\epsilon$ is used, then the liquid crystal molecules are twisted by about 90 degrees while the liquid crystal layer is in "ON state", but are aligned in one direction while the liquid crystal layer is in "OFF state". In the following preferred embodiments, the present invention will be described as using a liquid crystal material having positive refractive index anisotropy $\Delta\epsilon$. It should be understood, however, that the present invention can also be carried out even if a liquid crystal material having negative refractive index anisotropy $\Delta\epsilon$ is used.

Next, as shown in FIG. 4B, the second liquid crystal layer 75b is switched from OFF state into ON state when the voltage applied to the second liquid crystal layer 75b is increased from Low to High. As described above, the liquid crystal rise response time $\tau$ r is too short to form the unwanted ghost image. In this case, the phase difference created by the first liquid crystal layer 75a is $+\pi$, but the phase difference created by the second liquid crystal layer 75b is zero. Accordingly, the total phase difference of the polarized light that has been transmitted through these two liquid crystal layers 75a and 75b is $+\pi$. Thus, if the polarized light that entered the first liquid crystal layer 75a from the left-hand side thereof had a horizontal plane of polarization, then the polarized light that has gone out of the second liquid crystal layer 75b has a vertical plane of polarization.

Subsequently, when the voltage applied to the first liquid crystal layer 75a is increased from Low to High, the first liquid crystal layer 75a switches from OFF state into ON state as shown in FIG. 4C. The liquid crystal rise response time $\tau$ r is also too short to form the unwanted ghost image. In this case, the phase difference created by the first liquid crystal layer 75a is zero, and the phase difference created by the second liquid crystal layer 75b is also zero. Accordingly, the total phase difference of the polarized light that has been transmitted through these two liquid crystal layers 75a and 75b is zero. Thus, if the polarized light that entered the first liquid crystal layer 75a from the left-hand side thereof had a horizontal plane of polarization, then the polarized light that has gone out of the second liquid crystal layer 75b also has a horizontal plane of polarization.

Thereafter, the voltages being applied to the first and second liquid crystal layers 75a and 75b are both decreased from High to Low. Then, the two liquid crystal layers 75a and 75b change from the states (i.e., ON states) shown in FIG. 4C into the states shown in FIG. 4A (i.e., OFF states). In this case, the liquid crystal molecules of one of these two liquid crystal layers 75a and 75b form a mirror image of those of the other liquid crystal layer 75a or 75b. Accordingly, even if the polarized light that has gone out of the first liquid crystal layer 75a is elliptically polarized light, the elliptically polarized light is transformed into linearly polarized light while passing through the second liquid crystal layer 75b. In other words, even if the phase difference created by the first liquid crystal layer 75a changes relatively slowly from zero into $+\pi$ in the "fall period of the liquid crystal molecules", the phase difference created by the second liquid crystal layer 75b changes from zero toward $-\pi$. As a result, the total phase difference created by these two liquid crystal layers 75a and 75b always equals zero, and the polarization state does not change substantially.

Thus, even if it takes a relatively long time for the liquid crystal layers 75a and 75b to change from the states shown in FIG. 4C into the states shown in FIG. 4A (i.e., even if the liquid crystal fall response time $\tau$ d is rather long), linearly polarized light continuously goes out of the second liquid crystal layer 75b during the state transition period. That is to say, the polarization direction of the polarized light outgoing from the second liquid crystal layer 75b has not rotated at all from that of the polarized light that entered the first liquid crystal layer 75a. Thus, the liquid crystal fall response time $\tau$ d has nothing to do with the optical rotation of the plane of polarization of the polarized light. It is only when the liquid crystal layers 75a and 75b change from the states shown in FIG. 4A into the states shown in FIG. 4B and from the states shown in FIG. 4B into the states shown in FIG. 4C that the plane of polarization rotates by 90 degrees. The speeds of these two state transitions are both determined by the liquid crystal rise response time $\tau$ r.

In this manner, according to this preferred embodiment, the liquid crystal molecules are changed from the ON states into the OFF states (i.e., the liquid crystal molecules are made to "fall") without getting the image shifted at all, or with the image displayed at the predetermined location, because such state transitions usually take a relatively long time. That is to say, the outgoing light is supposed not to change its polarization direction at all while the liquid crystal molecules are falling. Accordingly, the shifting frequency of the optical shifter can be increased without being affected by the liquid crystal fall response time $\tau$ d. As a result, even if the liquid crystal fall response time $\tau$ d is relatively long, no ghost image or flicker will be produced.

The foregoing preferred embodiment of the present invention has been described about a TN mode liquid crystal material. However, similar effects are also achievable even if the present invention is applied to an ECB mode liquid crystal material. Hereinafter, it will be described with reference to FIGS. 5A through 5C and the following Table 2 how to cancel the unwanted polarized components when an ECB mode liquid crystal material is used.

TABLE 2

| | LC layer 85a (45 degrees) (phase difference; voltage) | LC layer 85b (−45 degrees) (phase difference; voltage) | Total Phase Difference | Outgoing Polarized Component |
|---|---|---|---|---|
| 5A | +π; OFF | −π; OFF | 0 | Horizontal or vertical |
| 5B | +π; OFF | 0; ON | +π | Vertical or Horizontal |
| 5C | 0; ON | 0; ON | 0 | Horizontal or vertical |

In the example illustrated in FIGS. 5A through 5C, a first liquid crystal layer 85a, in which ECB mode liquid crystal molecules are oriented at 45 degrees, and a second liquid crystal layer 85b, in which ECB mode liquid crystal molecules are oriented at −45 degrees, are disposed in front of a birefringent element (not shown in FIGS. 5A through 5C). The basic configuration of this optical shifter is the same as that shown in FIG. 3.

First, in the state shown in FIG. 5A, the voltages being applied to the two liquid crystal layers 85a and 85b are low and the liquid crystal layers 85a and 85b are in OFF state. Then, the phase difference created by the first liquid crystal layer 85a is +π while the phase difference created by the second liquid crystal layer 85b is −π. Accordingly, the total phase difference of the polarized light that has been transmitted through these two liquid crystal layers 85a and 85b is zero. Thus, supposing the polarized light that entered the first liquid crystal layer 85a from the left-hand side thereof had a horizontal plane of polarization, the polarized light that has gone out of the second liquid crystal layer 85b also has a horizontal plane of polarization.

Next, when the voltage applied to the second liquid crystal layer 85b is increased from Low to High, the second liquid crystal layer 85b switches from OFF state into ON state as shown in FIG. 5B. As described above, the liquid crystal rise response time τ r is too short to form the unwanted ghost image. In this case, the phase difference created by the first liquid crystal layer 85a is +π, but the phase difference created by the second liquid crystal layer 85b is zero. Accordingly, the total phase difference of the polarized light that has been transmitted through these two liquid crystal layers 85a and 85b is +π. Thus, if the polarized light that entered the first liquid crystal layer 85a from the left-hand side thereof had a horizontal plane of polarization, then the polarized light that has gone out of the second liquid crystal layer 85b has a vertical plane of polarization.

Subsequently, when the voltage applied to the first liquid crystal layer 85a is increased from Low to High, the first liquid crystal layer 85a switches from OFF state into ON state as shown in FIG. 5C. The liquid crystal rise response time τ r is also too short to form the unwanted ghost image. In this case, the phase difference created by the first liquid crystal layer 85a is zero, and the phase difference created by the second liquid crystal layer 85b is also zero. Accordingly, the total phase difference of the polarized light that has been transmitted through these two liquid crystal layers 85a and 85b is zero. Thus, if the polarized light that entered the first liquid crystal layer 85a from the left-hand side thereof had a horizontal plane of polarization, then the polarized light that has gone out of the second liquid crystal layer 85b also has a horizontal plane of polarization.

Thereafter, the voltages being applied to the first and second liquid crystal layers 85a and 85b are both decreased from High to Low. Then, the two liquid crystal layers 85a and 85b change from the states (i.e., ON states) shown in FIG. 5C into the states shown in FIG. 5A (i.e., OFF states). In this case, although the liquid crystal fall response time τ d is relatively long, the liquid crystal molecules of one of these two liquid crystal layers 85a and 85b form a mirror image of those of the other liquid crystal layer 85a or 85b. Accordingly, even if the polarized light that has gone out of the first liquid crystal layer 85a is elliptically polarized light, the unwanted polarized components are eliminated, and the elliptically polarized light is transformed into linearly polarized light while passing through the second liquid crystal layer 85b. In other words, in the "fall period of the liquid crystal molecules", the phase difference created by the first liquid crystal layer 85a changes relatively slowly from zero into +π and the phase difference created by the second liquid crystal layer 85b changes from zero toward −π. As a result, the total phase difference created by these two liquid crystal layers 85a and 85b always equals zero, and the polarization state does not change substantially.

Thus, even if it takes a relatively long time for the liquid crystal layers 85a and 85b to change from the states shown in FIG. 5C into the states shown in FIG. 5A (i.e., even if the liquid crystal fall response time τ d is relatively long), linearly polarized light continuously goes out of the second liquid crystal layer 85b during the state transition period. That is to say, the polarization direction of the polarized light outgoing from the second liquid crystal layer 85b has not rotated at all from that of the polarized light that entered the first liquid crystal layer 85a. Thus, the liquid crystal fall response time τ d has nothing to do with the optical rotation of the plane of polarization of the polarized light.

In this manner, even when the ECB mode liquid crystal material is used, the shifting frequency of the optical shifter can be increased without being affected by the liquid crystal fall response time τ d. As a result, even if the liquid crystal fall response time τ d is relatively long, no ghost image or flicker will be produced.

It should be noted that in each of the two specific examples described above, the time at which the two liquid crystal layers are both switched from ON into OFF should preferably be well before the time at which one of the two liquid crystal layers will be switched from OFF into ON next. In other words, by the time that one of the two liquid crystal layers is switched from OFF into ON, the two liquid crystal layers will have to be turned OFF completely. And it takes the liquid crystal fall response time τ d to finish such a state transition. For these reasons, the voltages being applied to the two liquid crystal layers are preferably decreased from High to Low shortly after the two liquid crystal layers were both turned ON.

It should also be noted that while the two liquid crystal layers are changing from ON state into OFF state, no image may be shifted. Accordingly, if an image should be shifted every time subfields are switched, then the transition interval in which the two liquid crystal layers change from ON into OFF is preferably fully included in one subfield period.

Hereinafter, specific preferred embodiments of an optical display system according to the present invention will be described with reference to the accompanying drawings.

Embodiment 1

Figure 6A:
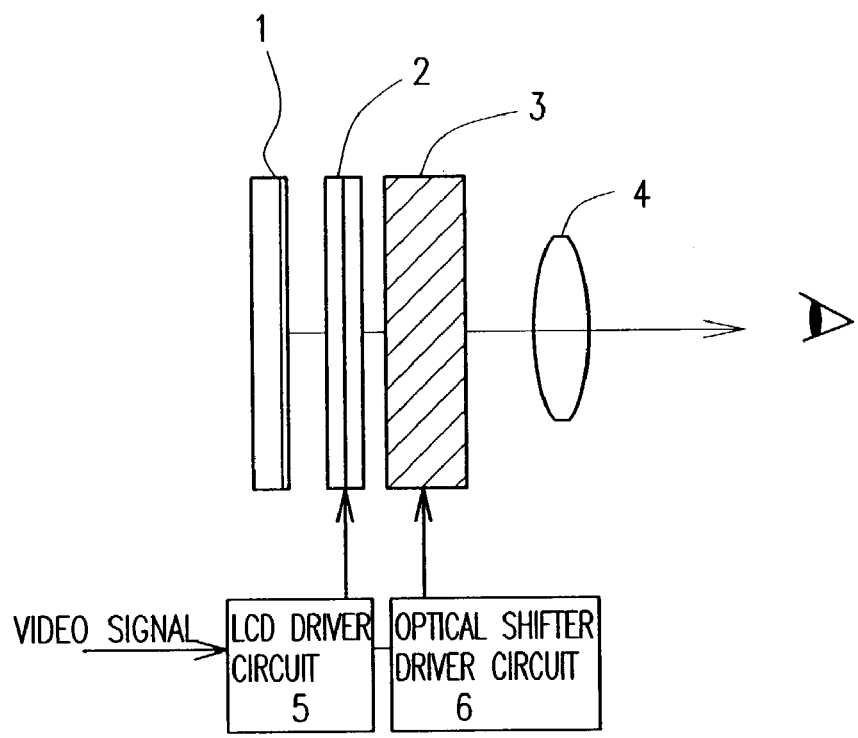
FIG. 6A is a cross-sectional view showing a basic configuration for an optical display system according to a first specific preferred embodiment of the present invention.

FIG. 6A schematically shows an optical display system according to a first specific preferred embodiment of the present invention. As shown in FIG. 6A, the optical display system includes a backlight 1, an LCD 2, an optical shifter 3 and an observational optical system 4. The backlight 1 is a light source to illuminate the LCD 2 of a transmission type. The LCD 2 receives a drive signal and a video signal from a driver circuit 5 and can display an image having contents represented by the video signal. The observational optical system 4 is provided to optically magnify the image that is displayed on the LCD 2. The observer can view the image that is displayed on the LCD 2 by way of the optical shifter 3 and the observational optical system 4.

In the specific preferred embodiment shown in FIG. 6A, a transmissive liquid crystal display that needs a backlight is used. Alternatively, as long as an image can be displayed thereon, the display may also be a reflective liquid crystal display or a self-emitting display panel such as an organic EL display or a plasma display panel (PDP).

The operation of the optical shifter 3 is controlled by another driver circuit 6, which is separately provided for the optical shifter 3. Synchronously with the display of a video signal on the LCD 2, the driver circuit 6 supplies a drive signal to the optical shifter 3. The driver circuit 6 includes a voltage applying section for applying voltages having multiple levels (i.e., high and low) to the liquid crystal cells included in the optical shifter 3.

In the optical display system shown in FIG. 6A, the backlight 1, LCD 2, observational optical system 4 and driver circuit 5 all have the same configurations as the counterparts of the conventional optical display system. Thus, the optical display system of this preferred embodiment is characterized by the configuration and operation of the optical shifter 3.

Figure 6B:
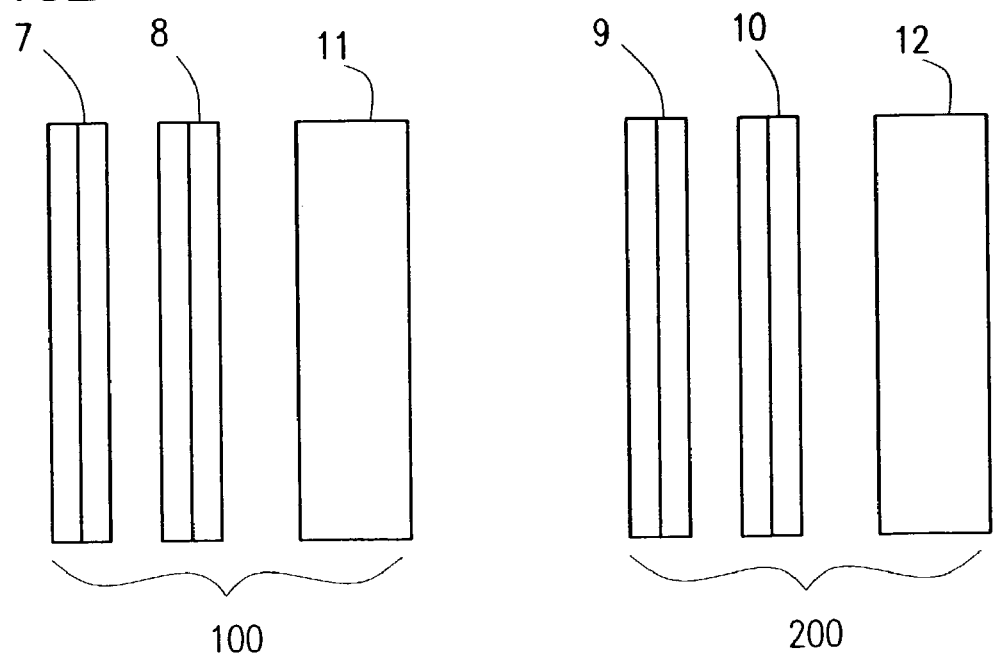
FIG. 6B is a cross-sectional view showing a configuration for an optical shifter according to the first preferred embodiment of the present invention.

FIG. 6B schematically shows the configuration of the optical shifter 3. As shown in FIG. 6B, the optical shifter 3 includes a first shifting section 100 for shifting the image vertically and a second shifting section 200 for shifting the image horizontally.

The first shifting section 100 includes two liquid crystal cells 7 and 8 and one birefringent element 11. Likewise, the second shifting section 200 also includes two liquid crystal cells 9 and 10 and one birefringent element 12. Each of the liquid crystal cells 7, 8, 9 and 10 includes: a liquid crystal layer; a pair of transparent electrodes (not shown) provided on the light incoming and outgoing sides of the liquid crystal layer, respectively; and a pair of transparent substrates that sandwiches these members between them. Although the liquid crystal cells 7 and 8 and the birefringent element 11 shown in FIG. 6B are horizontally spaced apart from each other, the liquid crystal cells 7 and 8 and the birefringent element 11 may be bonded together with an adhesive, for example, so that the first shifting section 100 works as one integral component. The same statement is applicable to the second shifting section 200.

In this preferred embodiment, the liquid crystal layer of each of the liquid crystal cells 7, 8, 9 and 10 is made of a TN mode liquid crystal material. Thus, the liquid crystal layer switches from a first state of rotating the plane of polarization of the incoming light by 90 degrees into a second state of transmitting the incoming light as it is substantially without rotating the plane of polarization, or vice versa, depending on whether the voltage applied thereto is high or low.

However, the liquid crystal material that can be used for the liquid crystal cells 7, 8, 9 and 10 is not limited to the TN mode liquid crystal material. Alternatively, any other type of liquid crystal material may be also used as long as the unwanted polarized components produced by one of the two liquid crystal layers are canceled by the other liquid crystal layer while the two liquid crystal layers are both switching from ON state into OFF state. For example, an ECB mode liquid crystal material may be naturally used.

The birefringent element 11 has an "optic axis" that defines a predetermined tilt angle with respect to the light incoming side of the birefringent element 11. On a plane including the propagation direction of the incoming light and the optic axis of the birefringent element 11 (which will be herein referred to as a "principal plane"), the birefringent element 11 can separate the incoming light into an ordinary ray and an extraordinary ray. Accordingly, if the polarization direction of the incoming light that is going to enter the birefringent element 11 is perpendicular to the principal plane, then the incoming light is an ordinary ray for the birefringent element 11 and is propagated straight through the principal plane. On the other hand, if the polarization direction of the incoming light that is going to enter the birefringent element 11 is parallel to the principal plane, then the incoming light is an extraordinary ray for the birefringent element 11 and is refracted within the principal plane.

The birefringent element 11 is made of a uniaxial crystalline material (e.g., quartz). However, the material for the birefringent element 11 is not limited to quartz but may be any other uniaxial crystalline material. Examples of other preferred materials include lithium niobate, calcite, mica, rutile ($TiO_2$) and nitratine ($NaNO_3$). If the total weight of the display system should be reduced as in a head mounted display (HMD), lithium niobate or rutile having relatively large refractive index anisotropy Δ n is preferably used. When the birefringent element 11 is made of such a high Δ n material, the minimum required image shift is realized by the birefringent element 11 with a reduced thickness. Thus, such a material can be used effectively to reduce the overall size or weight of the display system.

If the voltages applied to the liquid crystal cells 7 and 8 are changed, the polarization direction of the incoming light can be switched from perpendicular into parallel, or vice versa, to the principal plane of the birefringent element 11. In this manner, the incoming light can be shifted within the principal plane of the birefringent element 11. As a result, the image that is displayed on the LCD 2 can be shifted perpendicularly to the optical axis of the incoming light.

The second shifting section 200 also has the same configuration as the first shifting section 100. The only difference between these two shifting sections 100 and 200 is that the second shifting section 200 is disposed so as to define an angle of rotation of 90 degrees on the optical axis of the incoming light with respect to the first shifting section 100. Accordingly, the pixel shifting direction of the second shifting section 200 is perpendicular to that of the first shifting section 100. By using the first and second shifting sections 100 and 200 that are disposed at such positions, the image can be selectively shifted to one of four mutually different locations on the same (virtual) plane.

Hereinafter, it will be described with reference to FIGS. 7A through 7D and the following Table 3 how the optical shifter according to this preferred embodiment operates.

TABLE 3

| Shift | Applied voltage: high or low | | | |
|---|---|---|---|---|
| Location | LC cell 7 | LC cell 8 | LC cell 9 | LC cell 10 |
| A | OFF | OFF | OFF | ON |
| B | OFF | ON | ON → OFF | ON → OFF |
| C | OFF | ON | OFF | ON |
| D | ON → OFF | ON → OFF | ON → OFF | ON → OFF |

Figure 7A:
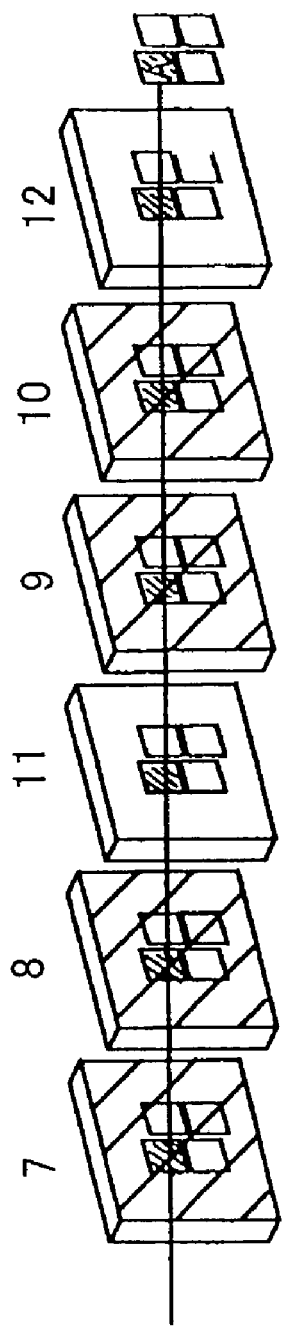
FIGS. 7A through 7D illustrate how the optical shifter of the first preferred embodiment operates.

First, as shown in FIG. 7A, the liquid crystal cells 7, 8 and 9 are turned OFF while the liquid crystal cell 10 is turned ON. In this case, an arbitrary pixel of the image that is presented on the display panel is supposed to be present at location A on the virtual plane.

Figure 7B:
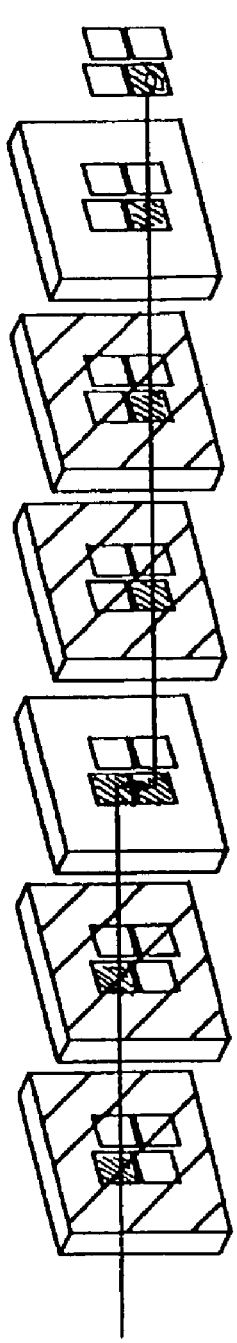

Next, as shown in FIG. 7B, the liquid crystal cells 8 and 9 are turned ON and the liquid crystal cell 10 is kept ON to shift the pixel to location B. The image is shifted by turning the OFF-state liquid crystal cells 8 and 9 ON. Accordingly, this shifting can be carried out relatively quickly synchronously with the switching of the image subfields.

Thereafter, while the current subfield is still being displayed, the ON-state liquid crystal cells 9 and 10 are turned OFF. The response of the liquid crystal material to the turn OFF of these liquid crystal cells 9 and 10 is slow. However, since the liquid crystal cells 9 and 10 are made of dextrorotatory and levorotatory liquid crystal materials, respectively, the polarization direction of the polarized light that is going to enter the birefringent element 12 is the same as the original one of the polarized light that was incident on the liquid crystal cell 9. Accordingly, the pixel location remains B.

Figure 7C:
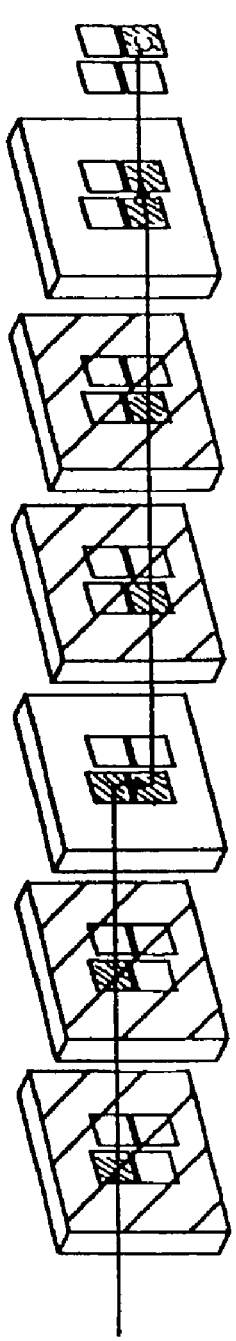

Subsequently, as shown in FIG. 7C, the liquid crystal cell 8 is kept ON and the liquid crystal cell 10 is turned ON to shift the pixel to location C. The image is shifted by turning the OFF-state liquid crystal cell 10 ON. Accordingly, this shifting can also be carried out relatively quickly synchronously with the switching of the image subfields.

Figure 7D:
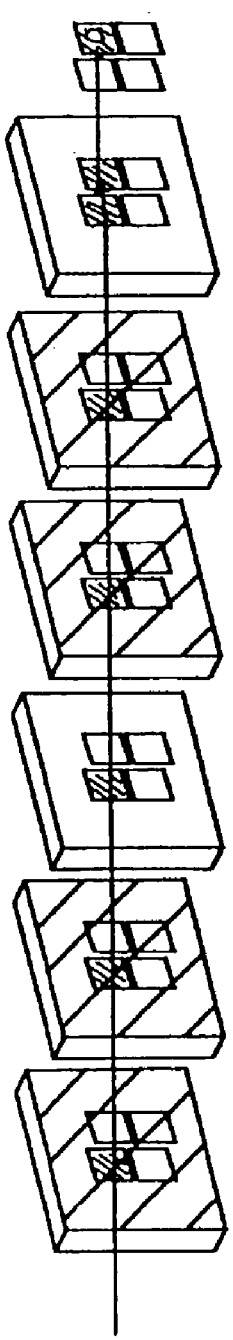

Next, as shown in FIG. 7D, the liquid crystal cells 7 and 9 are turned ON and the two other liquid crystal cells 8 and 10 are kept ON to shift the pixel to location D. Thereafter, while the current subfield is still being displayed, the ON-state liquid crystal cells 7, 8, 9 and 10 are all turned OFF. Even so, the polarization direction of the polarized light that is going to enter the birefringent element 12 is the same as the original one of the polarized light that was incident on the liquid crystal cell 9. Accordingly, the pixel location remains D.

Thereafter, the image is shifted from the location D to the location A by turning the OFF-state liquid crystal cell 10 ON and can be carried out as quickly as the shifting of the image to the location B, C or D.

Figure 13:
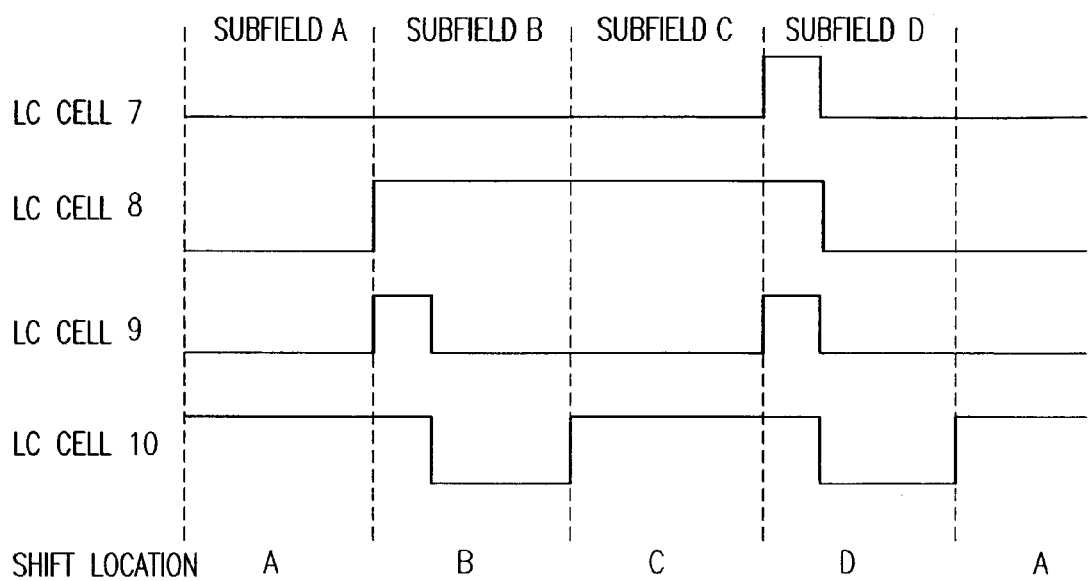
FIG. 13 is a timing diagram showing how the waveforms of the voltages to be applied to respective liquid crystal cells change in the first preferred embodiment of the present invention.

FIG. 13 shows the waveforms of the voltages to be applied to the liquid crystal cells 7, 8, 9 and 10 to operate the liquid crystal cells 7, 8, 9 and 10 as described above. In FIG. 13, the subfields A, B, C and D correspond to the locations A, B, C and D shown in FIGS. 7A, 7B, 7C and 7D, respectively. That is to say, in the subfield period A, the pixel is present at the location A shown in FIG. 7A. In the next subfield period B, the pixel is present at the location B shown in FIG. 7B.

As can be seen from FIG. 13, the voltages being applied to the liquid crystal cells 7 and 8 are decreased from High to Low at the same time. Likewise, the voltages being applied to the liquid crystal cells 9 and 10 are also decreased from High to Low at the same time.

The first time at which the voltages being applied to the liquid crystal cells 9 and 10 are decreased from High to Low is included in the subfield period B, and is well before the voltage to be applied to the liquid crystal cell 10 is increased from Low to High next time. If the voltages being applied to the liquid crystal cells 9 and 10 are decreased from High to Low, the liquid crystal layers thereof will be turned completely OFF after the liquid crystal fall response time τ d has passed. That is to say, before the liquid crystal fall response time τ d passes, the liquid crystal layers are not completely OFF. However, for the reasons described above, the image subfield B does not shift during this subfield period B and no ghost image is produced, either.

It should be noted that the backlight of the optical display system according to the preferred embodiment described above may be replaced with an illumination source that emits light with directivity and the observational optical system may be replaced with a projection lens. Then, the optical display system may serve as a projection type display system. Even so, the resolution can also be increased by the optical shifter of the present invention as well as the HMD described above.

Figures 8A, 8B:
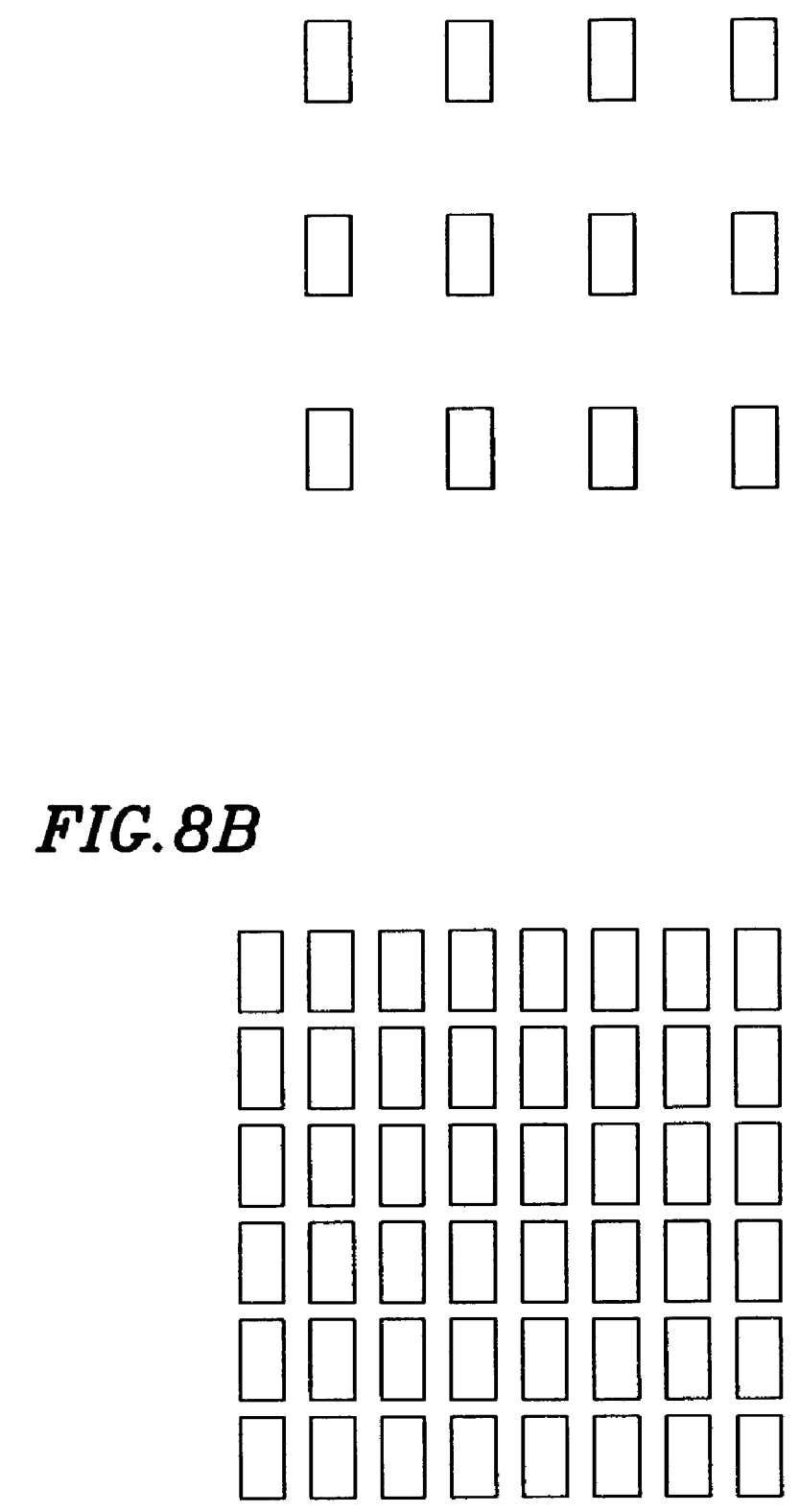

FIG. 8A illustrates the resultant arrangement of pixels on which the optical shifter did not perform the shifting operation described above, while FIG. 8B illustrates the resultant arrangement of pixels on which the optical shifter performed the shifting operation. As can be seen from FIGS. 8A and 8 B, by using the optical shifter of the present invention, the number of effective pixels of the LCD 2 can be increased fourfold.

Embodiment 2

Figure 9:
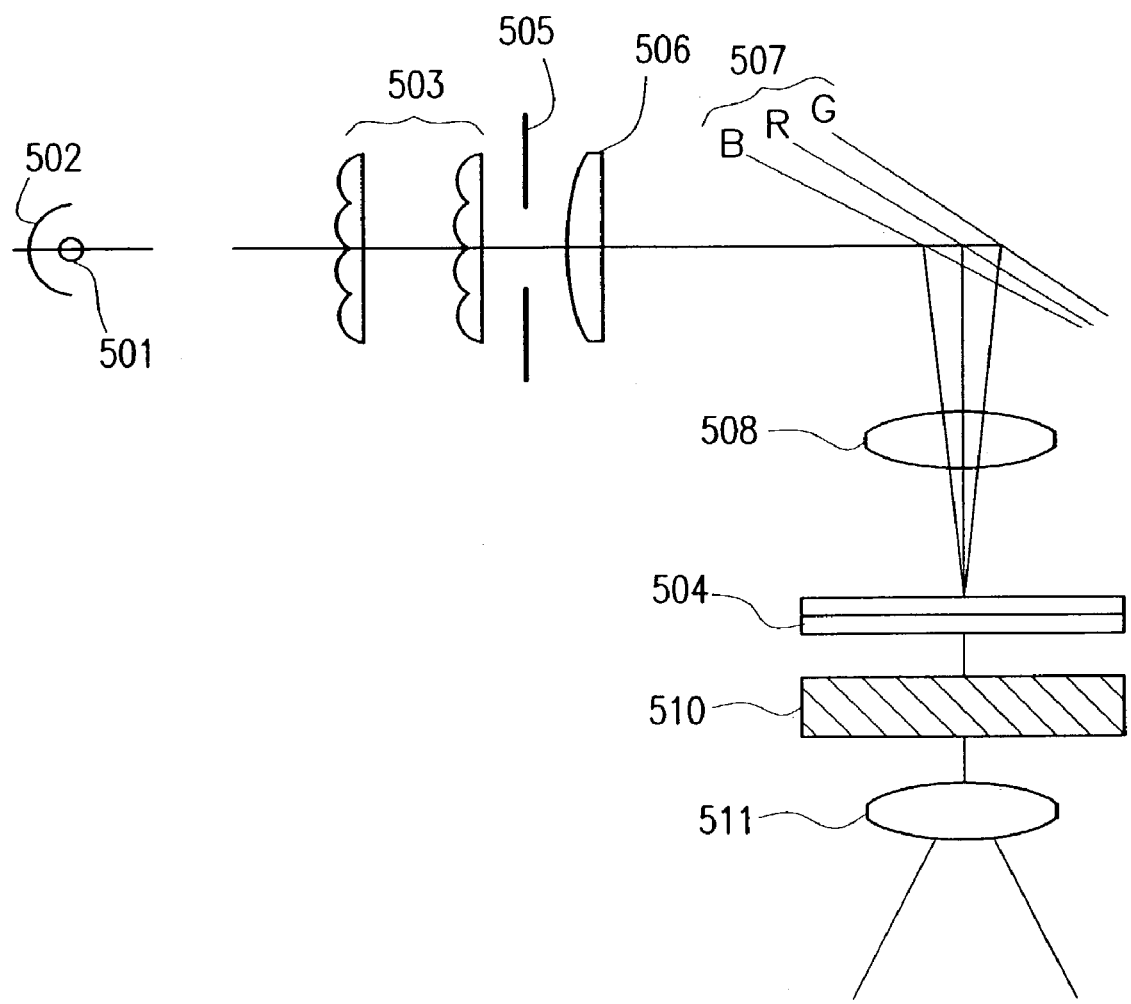
FIG. 9 schematically illustrates an optical display system according to a second specific preferred embodiment of the present invention.

Hereinafter, an optical display system according to a second specific preferred embodiment of the present invention will be described with reference to FIG. 9.

In the optical display system according to this preferred embodiment, light (including at least R, G and B components) that has been emitted from a light source 501 is reflected by a parabolic mirror 502 so as to be collimated into a substantially parallel beam, which is then incident onto fly eye lenses 503. The fly eye lenses 503 are used to illuminate an LCD panel 504 uniformly. An aperture 505 is provided to selectively pass the light beam that has gone out of the fly eye lenses 503 and thereby regulate the degree of parallelism of the illumination to be incident onto the LCD panel 504. The aperture 505 has a rectangular opening, the shape of which is designed so as to match the pixel shape. The light beam that has passed the aperture 505 passes a lens 506, and then is separated by dichroic mirrors 507R, 507G and 507B into R, G and B light rays. The LCD panel 504 is illuminated with the light beam that has been substantially collimated by the lenses 506 and 508. However, the R, G and B light rays, into which the light beam has been separated by the dichroic mirrors 507R, 507G and 507B, are incident onto the LCD panel 504 at mutually different angles. In this preferred embodiment, 0.9 inch panel having a resolution of 768×1024 dots is used as the LCD panel 504.

Figure 10:
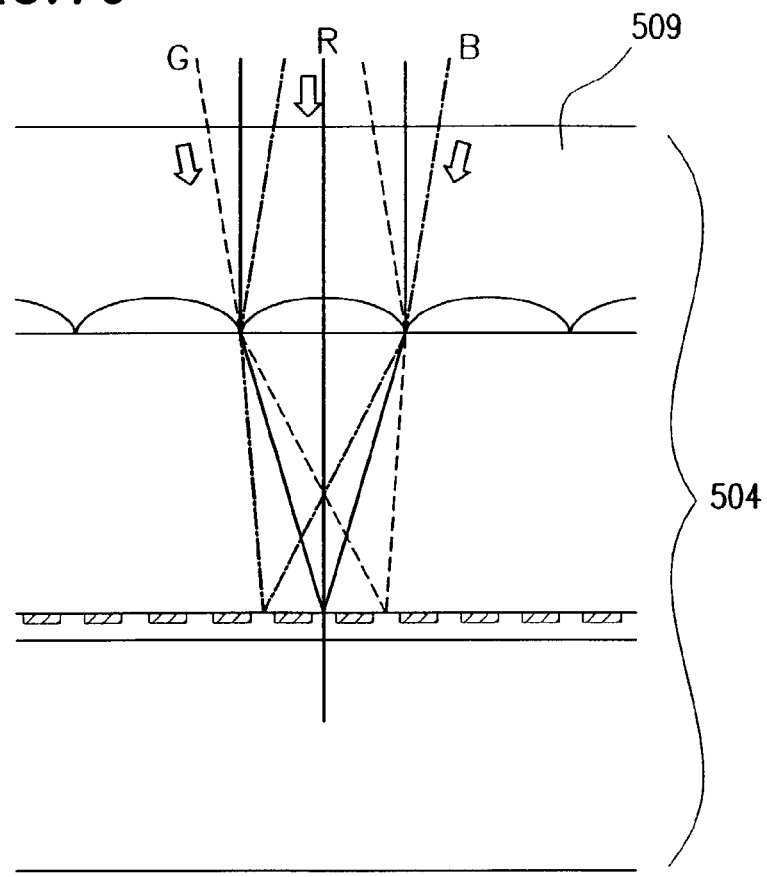
FIG. 10 is a cross-sectional view illustrating an LCD panel for use in the second preferred embodiment.

FIG. 10 is a cross-sectional view illustrating how the R, G and B light rays are incident onto the LCD panel 504. As shown in FIG. 10, an array of microlenses 509 is disposed on the light incoming side of the LCD panel 504. Each of the microlenses 509 is provided for three pixels representing the three primary colors of red, green and blue (i.e., a set of R, G and B pixels). The R, G and B light rays are incident onto each microlens 509 at mutually different angles and then are focused by the lens 509 onto their associated pixels. Since these three pixels are driven independently, the R, G and B light rays are modulated independently.

Referring back to FIG. 9, the light beam, which has been transmitted through, and thereby modulated by, the LCD panel 504, is passed through an optical shifter 510 and then incident onto a projection lens 511. Consequently, the light beam, passed through the projection lens 511, forms an image on a screen (not shown). The image on the screen is shifted periodically by the optical shifter 510.

Figure 11:
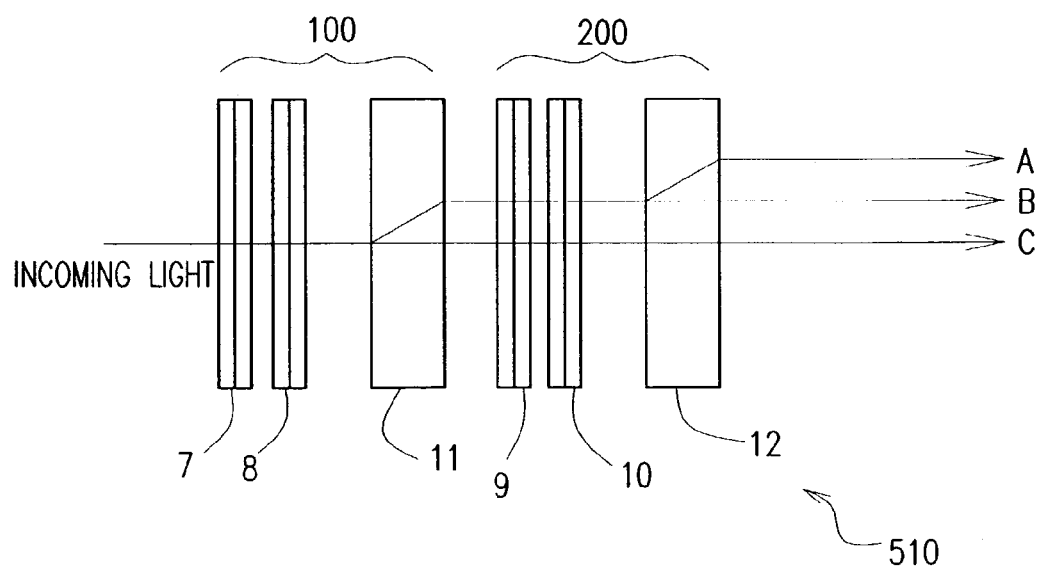
FIG. 11 is a cross-sectional view showing an optical shifter according to the second preferred embodiment.

Next, the optical shifter 510 according to this second preferred embodiment of the present invention will be described in detail with reference to FIG. 11. The optical shifter 510 includes a first shifting section 100 and a second shifting section 200 as shown in FIG. 11. The configurations of the first and second shifting sections 100 and 200 are the same as those already described for the first preferred embodiment. In this second preferred embodiment, however, the first and second shifting sections 100 and 200 are disposed such that the shifting direction of the first shifting section 100 is parallel to that of the second shifting section 200. In such an arrangement, the image can be shifted to three mutually different locations A, B and C that are arranged on the same line included on a plane perpendicular to the optical axis of the incoming light.

Figure 12:
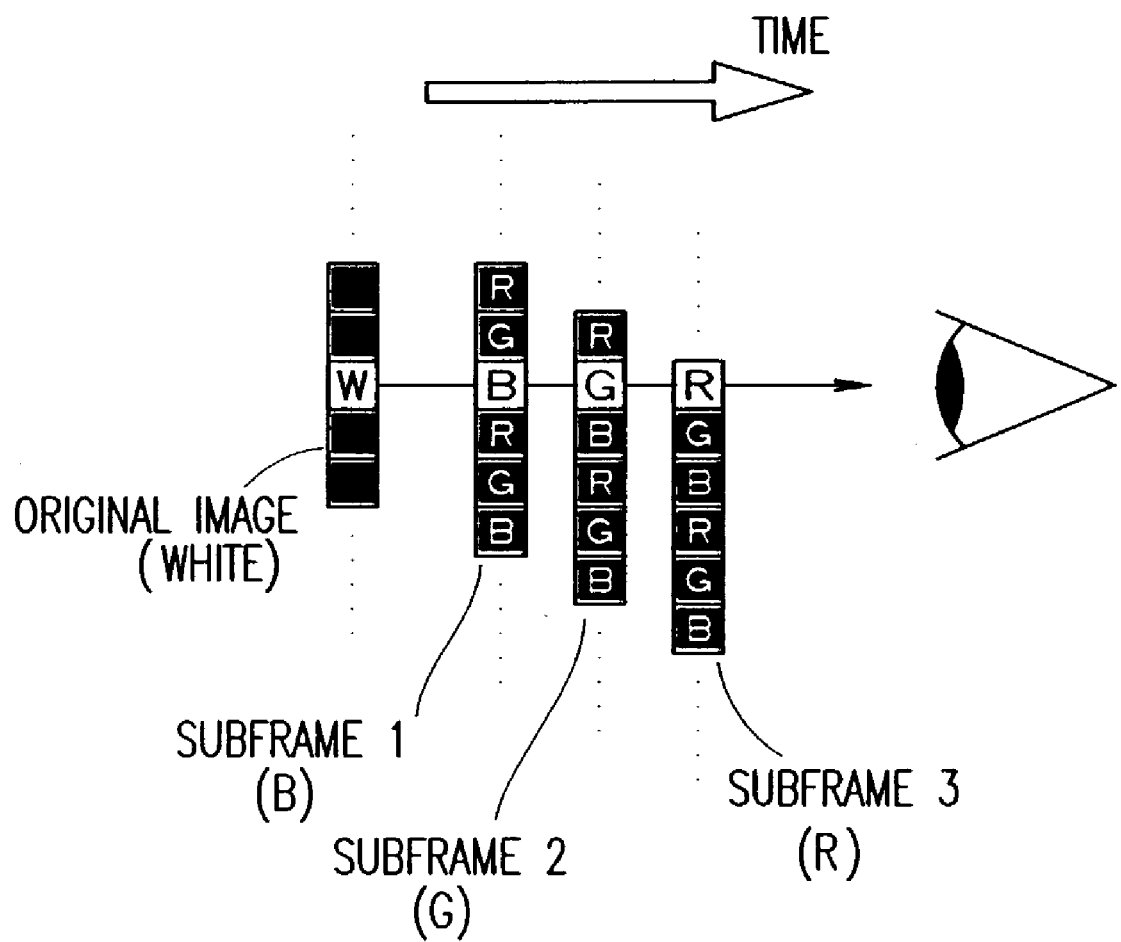
FIG. 12 schematically illustrates how an image is shifted optically.

FIG. 12 schematically illustrates how the subframes are shifted vertically by the optical shifter 510 shown in FIG. 11. Multiple subframes that make up one complete image are sequentially shifted pixel by pixel in one direction (i.e., are shifted vertically in the example illustrated in FIG. 12 but may also be shifted horizontally) by the optical shifter 510. Thus, the same pixel area on the screen is sequentially illuminated with the light rays representing the blue, green, red, blue, green and red parts, etc. of the image by a time sequential technique. An optical display system having such an arrangement uses just one LCD panel 504 but still achieves a resolution that is almost as high as that of a projection-type display system with three LCD panels.

Next, the voltages to be applied to the liquid crystal cells 7, 8, 9 and 10 according to this preferred embodiment will be described with reference to FIG. 11 and the following Table 4:

TABLE 4

| Shift Location | Applied voltage: high or low | | | |
|---|---|---|---|---|
| | LC cell 7 | LC cell 8 | LC cell 9 | LC cell 10 |
| A | OFF | ON | OFF | OFF |
| B | OFF | ON | OFF | ON |
| C | ON → OFF | ON → OFF | ON → OFF | ON → OFF |

First, the liquid crystal cells 7, 9 and 10 are turned OFF while the liquid crystal cell 8 is turned ON. In this case, an arbitrary pixel of the image that is displayed on the LCD panel 504 is supposed to be present at the location A shown in FIG. 11.

Next, the liquid crystal cells 7 and 9 are kept OFF, the liquid crystal cell 8 is kept ON, and the liquid crystal cell 10 is turned ON to shift the pixel to location B. That is to say, this image shifting is carried out by turning the OFF-state liquid crystal cell 10 ON.

Subsequently, the liquid crystal cells 7 and 9 are turned ON and the two other liquid crystal cells 8 and 10 are kept ON to shift the pixel to location C. That is to say, this image shifting is carried out by turning the OFF-state liquid crystal cells 7 and 9 ON.

Thereafter, before the subfields are switched next time (i.e., while the current subfield is still being displayed), the ON-state liquid crystal cells 7, 8, 9 and 10 are all turned OFF. The response of the liquid crystal material to the turn OFF of these liquid crystal cells 7, 8, 9 and 10 is slow. However, since each pair of liquid crystal cells 7, 8 and 9, 10 is made of dextrorotatory and levorotatory liquid crystal materials, respectively, the polarization direction of the polarized light that is going to enter the birefringent element 12 is the same as the original one of the polarized light that was incident on the liquid crystal cell 7. Accordingly, the pixel location remains C.

The image can be shifted from the location C to the location A just by turning ON the liquid crystal cell 8. Accordingly, the image shifting to the location A can be done as quickly as the image shifting to the location B or C.

As described above, according to this preferred embodiment, just by turning OFF-state liquid crystal cell(s) ON quickly enough synchronously with the switching of image subfields, the pixel can be shifted from the location A to the location B and then to the location C. Thus, an image of quality can be displayed without producing any ghost image or flicker.

Figure 14:
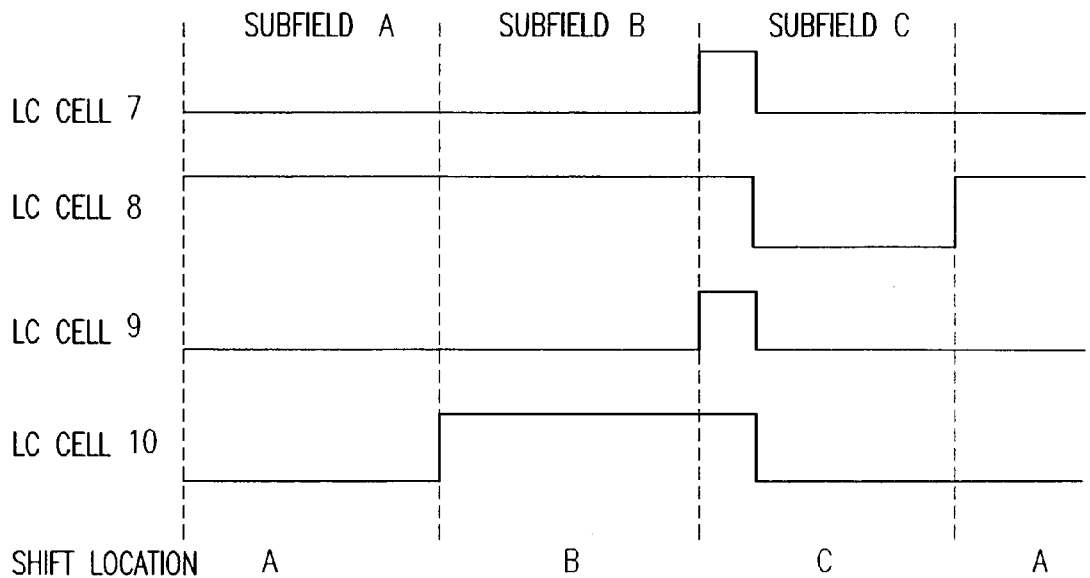
FIG. 14 is a timing diagram showing how the waveforms of the voltages to be applied to respective liquid crystal cells change in the second preferred embodiment of the present invention.

FIG. 14 shows the waveforms of the voltages to be applied to the liquid crystal cells 7, 8, 9 and 10 to operate the liquid crystal cells 7, 8, 9 and 10 as described above. In FIG. 14, the subfields A, B and C respectively correspond to the locations A, B and C shown in FIG. 11. That is to say, in the subfield period A, the pixel is present at the location A shown in FIG. 11. In the next subfield period B, the pixel is present at the location B shown in FIG. 11.

As can be seen from FIG. 14, the voltages being applied to the liquid crystal cells 7 and 8 are decreased from High to Low at the same time. Likewise, the voltages being applied to the liquid crystal cells 9 and 10 are also decreased from High to Low at the same time.

The time at which the voltages being applied to the liquid crystal cells 7, 8, 9 and 10 are decreased from High to Low is included in the subfield period C, and is well before the voltage to be applied to the liquid crystal cell 8 is increased from Low to High next time. If the voltages being applied to the liquid crystal cells 7, 8, 9 and 10 are decreased from High to Low, the liquid crystal layers will be turned completely OFF after the liquid crystal fall response time $\tau d$ has passed. That is to say, before the liquid crystal fall response time $\tau d$ passes, the liquid crystal layers are not completely OFF. However, for the reasons described above, the image subfield C does not shift during this subfield period C and no ghost image is produced, either.

The optical display system according to the second preferred embodiment described above is a projection type display system to project an image onto a screen. However, if the projection lens 511 is replaced with an observational optical system to get a magnified virtual image viewed, the present invention is also applicable for use in an HMD.

The pixel is shifted to four locations in the first preferred embodiment and to three locations in the second preferred embodiment. However, the present invention is in no way limited to these specific preferred embodiments. Alternatively, the present invention is applicable for use in any other pattern shifting, e.g., image shifting between two locations or among four locations that are arranged in line.

In the first and second preferred embodiments described above, each of the liquid crystal cells 7, 8, 9 and 10 is switched during its associated subfield period. However, depending on the response speed of the liquid crystal material, the liquid crystal cell(s) 7, 8, 9 and/or 10 may be turned ON or OFF during the previous or subsequent subfield period so that switching of the liquid crystal cells 7, 8, 9 and 10 is well balanced during their associated subfield periods.

Embodiment 3

Hereinafter, a third specific preferred embodiment of the present invention will be described.

An optical shifter according to this third preferred embodiment basically has the configuration shown in FIG. 3 just like the optical shifter of the first preferred embodiment described above.

A more detailed configuration of the optical shifter according to this third preferred embodiment will be described with reference to FIG. 15.

Figure 15:
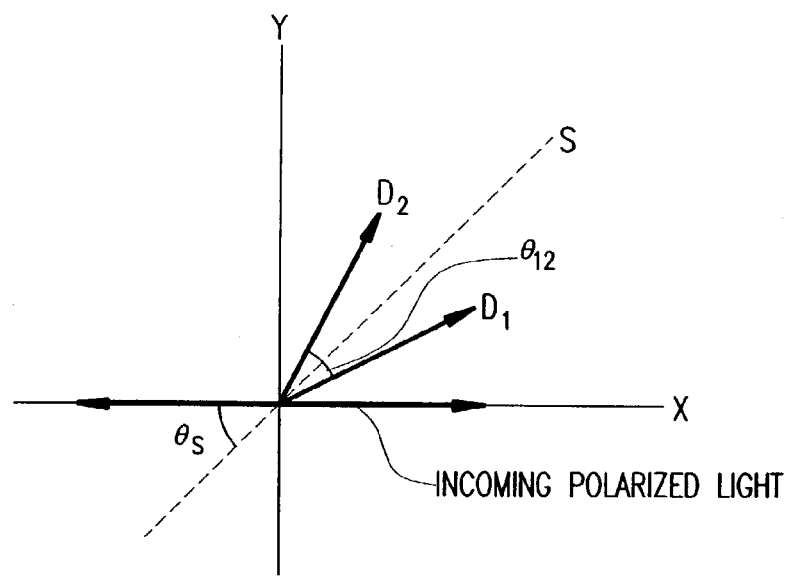
FIG. 15 shows a relationship between the directors of two liquid crystal layers of a pair of liquid crystal cells and the polarization direction of incoming light in an optical shifter according to a preferred embodiment of the present invention.

FIG. 15 shows a situation where the linearly polarized light that is going to enter the optical shifter has a polarization direction that is parallel to the X-axis of the X-Y coordinate system. In FIG. 15, $D_1$ denotes the director in the intermediate portion of the liquid crystal layer 75a of the first liquid crystal cell 7. $D_2$ denotes the director in the intermediate portion of the liquid crystal layer 75b of the second liquid crystal cell 8. $\theta_{12}$ denotes an angle that is defined between the directors $D_1$ and $D_2$ while no voltages are being applied to the liquid crystal layers 75a and 75b. S denotes a bisector that divides the angle $\theta_{12}$ into two equal parts while no voltages are being applied to the liquid crystal layers 75a and 75b. And $\theta_S$ denotes an angle that is defined between the bisector S and the polarization direction of the incoming polarized light (i.e., the X-axis). In this preferred embodiment, the angle $\theta_{12}$ is defined to fall within the range of 42 degrees to 45 degrees and the angle $\theta_S$ is defined to be about 45 degrees. More preferably, the angle $\theta_{12}$ falls within the range of 42 degrees to 44 degrees. As used herein, an angle of "about 45 degrees" falls within the range of 44 degrees to 46 degrees.

In this preferred embodiment, at least one of the two liquid crystal layers of the two liquid crystal cells is made of an ECB (horizontal alignment) mode liquid crystal material. The ECB (horizontal alignment) mode is realized by defining the alignment directions of a pair of substrates, which sandwiches a nematic liquid crystal layer between them, to be parallel to each other. While no voltages are being applied thereto, the liquid crystal layers have their directors parallelized to the alignment directions of the substrates. Accordingly, the locations of the two liquid crystal cells are defined with respect to the polarization direction of the incoming light such that the directors $D_1$ and $D_2$ of the two liquid crystal layers define the angles described above. If the two liquid crystal cells are both made of ECB (horizontal alignment) mode liquid crystal materials, the effects achieved are similar to those accomplished by stacking two half-wave plates one upon the other while no voltages are being applied to the liquid crystal layers.

Where the ECB (horizontal alignment) mode liquid crystal layers are used in this manner, each of the liquid crystal layers preferably has a retardation of 220 nm to 280 nm. A retardation value falling within this range is approximately a half of 550 nm, which is substantially the center wavelength of the visible radiation range. Accordingly, while no voltages are applied to the liquid crystal layers, each of the liquid crystal cells functions as a half-wave plate with respect to the incoming linearly polarized light having a wavelength of about 550 nm, thereby rotating the plane of polarization of the incoming light. This angle of rotation is twice as large as the angle that is defined between the polarization direction of the incoming light and the director of the liquid crystal layer.

Hereinafter, it will be described how the optical shifter operates where the liquid crystal layers 75a and 75b of the first and second liquid crystal cells 7 and 8 are made of ECB (horizontal alignment) mode liquid crystal materials and have retardations that fall within the range of 220 nm to 280 nm while no voltages are applied thereto.

In this case, while the voltages to be applied to the liquid crystal layers of the two liquid crystal cells 7 and 8 are OFF, the polarization direction of the incoming linearly polarized light shown in FIG. 15 is rotated by approximately 45 degrees counterclockwise by the first liquid crystal cell 7 so as to be substantially aligned with the bisector S. Strictly speaking, though, the light that has been transmitted through the first liquid crystal cell 7 is not polarized quite linearly but slightly elliptically due to the wavelength dispersion caused by the liquid crystal layer thereof. This phenomenon will be described in further detail below.

Suppose light having a wavelength of 550 nm is incident onto a liquid crystal layer having a retardation of 275 nm, which is half as long as 550 nm. In this case, the director $D_1$ of the first liquid crystal cell 7 defines an angle of 22.5 degrees with the X-axis and the polarization direction of the incoming light (having the wavelength of 550 nm) is defined to be parallel to the X-axis. Then, the polarization direction of the incoming light is rotated by 45 degrees (=22.5×2) by the first liquid crystal cell 7. However, if the incoming light has a wavelength that is not equal to 550 nm, the polarization direction thereof is not rotated in this manner due to the wavelength dispersion caused by the liquid crystal layer.

Supposing the wavelength of the incoming light is $\lambda$ nm, the retardation of the liquid crystal layer is $R(\lambda)$ nm and the phase difference to be caused in the incoming light being transmitted through the liquid crystal layer is $\phi(\lambda)$, the phase difference $\phi(\lambda)$ is given by $R(\lambda)/\lambda$. It should be noted that the retardation R of the liquid crystal layer and the phase difference $\phi$ are functions of the wavelength $\lambda$.

If light having a wavelength of 550 nm is incident onto a liquid crystal layer having a retardation of 275 nm, then $\phi$ (550)=275/550=½=0.5. Thus, the liquid crystal layer functions just as a half-wave plate. However, if light having a wavelength of 450 nm (i.e., a blue ray) is incident onto the liquid crystal layer, then $\phi$ (450)=275/450≈0.61. On the other hand, if light having a wavelength of 650 nm (i.e., a red ray) is incident onto the liquid crystal layer, then $\phi$ (650)=275/650≈0.42. As can be seen, if a blue or red ray is incident, such a phase difference is created and the liquid crystal layer cannot function as a half-wave plate. As a result, the linearly polarized light is transformed into somewhat elliptically polarized one.

However, according to the arrangement of this preferred embodiment, when the light is transmitted through the second liquid crystal cell 8, the polarization direction of the outgoing light is aligned with the Y-axis, which is perpendicular to the direction of the incoming polarized light, over a broad wavelength range. The reason is as follows. Specifically, since the angle $\theta_{12}$ defined between the directors $D_1$ and $D_2$ of the two liquid crystal layers 75a and 75b falls within the range of 42 degrees to 45 degrees, the slightly elliptically polarized light that entered the second liquid crystal cell 8 is transformed into linearly polarized light again and the unwanted effects of the wavelength dispersion are substantially eliminated. More specifically, if a blue or red ray having a wavelength of 450 nm or 650 nm is incident onto the first liquid crystal cell 7, a phase difference that is not equal to ½ will be once created. However, the phase difference will be substantially equalized with that of a green ray having a wavelength of 550 nm by the second liquid crystal cell 8.

Thus, if the optical shifter according to this preferred embodiment of the present invention is used, image shifting is realized with the resolution increased significantly and almost without producing any ghost image, no matter which of red, green and blue rays is incident onto the optical shifter.

Hereinafter, specific preferred embodiments of an optical display system according to the present invention will be described with reference to the accompanying drawings.

As shown in FIG. 6A, the optical display system of this third preferred embodiment also includes a backlight 1, an LCD 2, an optical shifter 3 and an observational optical system 4. The backlight 1 is a light source to illuminate the LCD 2 of a transmission type. The LCD 2 receives a drive signal and a video signal from a driver circuit 5 and can display an image having contents represented by the video signal. The observational optical system 4 is provided to optically magnify the image that is displayed on the LCD 2. The observer can view the image that is displayed on the LCD 2 by way of the optical shifter 3 and the observational optical system 4.

In the specific preferred embodiment shown in FIG. 6A, a transmissive liquid crystal display that needs a backlight is used. Alternatively, as long as an image can be displayed thereon, the display may also be a reflective liquid crystal display or a self-emitting display panel such as an organic EL display or a plasma display panel (PDP).

The operation of the optical shifter 3 is controlled by another driver circuit 6, which is separately provided for the optical shifter 3. Synchronously with the display of a video signal on the LCD 2, the driver circuit 6 supplies a drive signal to the optical shifter 3. The driver circuit 6 includes a voltage applying section for applying voltages having multiple levels (i.e., high and low) to the liquid crystal cells included in the optical shifter 3.

In the optical display system shown in FIG. 6A, the backlight 1, LCD 2, observational optical system 4 and driver circuit 5 all have the same configurations as the counterparts of the conventional optical display system. Thus, the optical display system of this preferred embodiment is characterized by the configuration and operation of the optical shifter 3.

The optical shifter 3 of this third preferred embodiment also has basically the same configuration as that shown in FIG. 3. However, in this optical shifter 3, the two liquid crystal layers thereof are both made of ECB (horizontal alignment) mode liquid crystal materials. Each of the two liquid crystal layers has a retardation of 220 nm to 280 nm while no voltages are applied thereto. The liquid crystal cells 7 and 8 are arranged such that the directors thereof define the angle shown in FIG. 15 with respect to the polarization direction of the incoming light.

In this preferred embodiment, the liquid crystal layers of the liquid crystal cells 7 and 8 are made of ECB mode liquid crystal materials. However, any other type of liquid crystal material may also be used as long as the polarization direction of the incoming light is either rotated by approximately 90 degrees or not rotated at all while the incoming light is being transmitted through multiple liquid crystal layers.

The birefringent element 11 has an optic axis that defines a predetermined tilt angle with respect to the light incoming side of the birefringent element 11. On a "principal plane", the birefringent element 11 can separate the incoming light into an ordinary ray and an extraordinary ray. Accordingly, if the polarization direction of the incoming light that is going to enter the birefringent element 11 is perpendicular to the principal plane, then the incoming light is an ordinary ray for the birefringent element 11 and is propagated straight through the principal plane. On the other hand, if the polarization direction of the incoming light that is going to enter the birefringent element 11 is parallel to the principal plane, then the incoming light is an extraordinary ray for the birefringent element 11 and is refracted within the principal plane.

The birefringent element 11 is made of a uniaxial crystalline material (e.g., quartz). However, the material for the birefringent element 11 is not limited to quartz but may be any other uniaxial crystalline material. Examples of other preferred materials include lithium niobate, calcite, mica, rutile ($TiO_2$) and nitratine ($NaNO_3$). If the total weight of the display system should be reduced as in a head mounted display (HMD), lithium niobate or rutile having relatively large refractive index anisotropy $\Delta n$ is preferably used. When the birefringent element 11 is made of such a high $\Delta n$ material, the minimum required image shift is realized by the birefringent element 11 with a reduced thickness. Thus, such a material can be used effectively to reduce the overall size or weight of the display system.

If the voltages applied to the liquid crystal layers of the liquid crystal cells 7 and 8 are changed, the polarization direction of the incoming light can be switched from perpendicular into parallel, or vice versa, to the principal plane of the birefringent element 11. In this manner, the incoming light can be shifted within the principal plane of the birefringent element 11. As a result, the image that is displayed on the LCD 2 can be shifted perpendicularly to the optical axis of the incoming light.

It should be noted that the backlight of the optical display system according to the preferred embodiment described above may be replaced with an illumination source that emits light with directivity and the observational optical system may be replaced with a projection lens. Then, the optical display system may also serve as a projection type display system. Even so, the resolution can also be increased by the optical shifter of the present invention as well as the HMD described above.

Hereinafter, a specific example and a comparative example for the third preferred embodiment of the present invention will be described.

EXAMPLE

Figure 16:
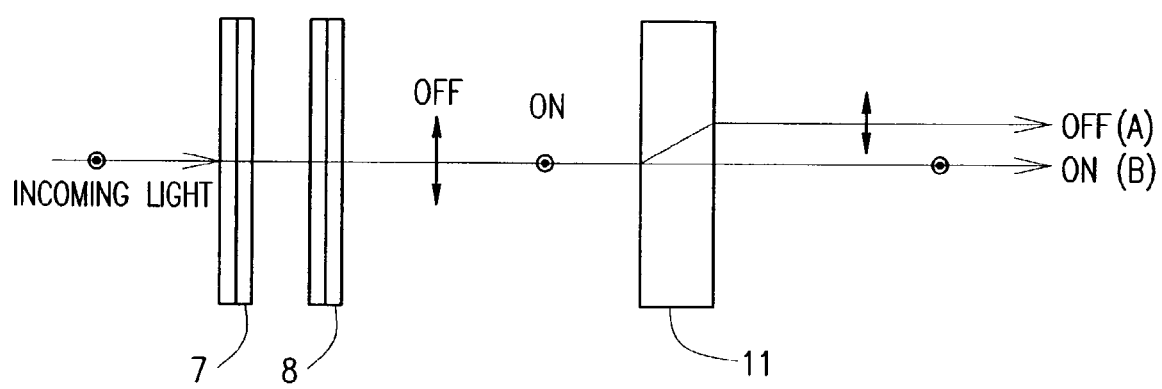
FIG. 16 schematically illustrates a configuration for an optical shifter that was used in a specific example of preferred embodiments of the present invention.

In this specific example, an optical shifter including two liquid crystal cells 7 and 8 and a birefringent element 11 as shown in FIG. 16 was used. Each of the liquid crystal cells 7 and 8 was fabricated with an ECB (horizontal alignment) mode liquid crystal material and was disposed such that the orientation directions of the liquid crystal molecules in the liquid crystal cells 7 and 8 satisfy the relationship shown in FIG. 15. A quartz plate was used as the birefringent element 11.

An optical shifter having such a configuration was used and the ON/OFF states of the voltages to be applied to the liquid crystal cells 7 and 8 were controlled, thereby selectively shifting the light outgoing from one pixel to either location A or location B.

While no voltages were applied thereto, the liquid crystal layers of the liquid crystal cells 7 and 8 had a retardation of 275 nm. The orientation direction (i.e., the director $D_1$) of the liquid crystal molecules in the liquid crystal cell 7 defined about 23 degrees with the polarization direction of the incoming linearly polarized light, while the orientation direction (i.e., the director $D_2$) of the liquid crystal molecules in the liquid crystal cell 8 defined about 67 degrees with the polarization direction of the incoming linearly polarized light.

The percentages at which a ghost image was produced by the use of this optical shifter were estimated. The results are shown in the following Table 5:

TABLE 5

| Wavelength (nm) | Light reaching Location A | Light reaching Location B |
| --- | --- | --- |
| 450 | about 100% | about 0% |
| 550 | about 100% | about 0% |
| 650 | about 100% | about 0% |

As can be seen from the results shown in Table 5, almost no incoming light reached the location B in this specific example.

Comparative Example

Figure 1:
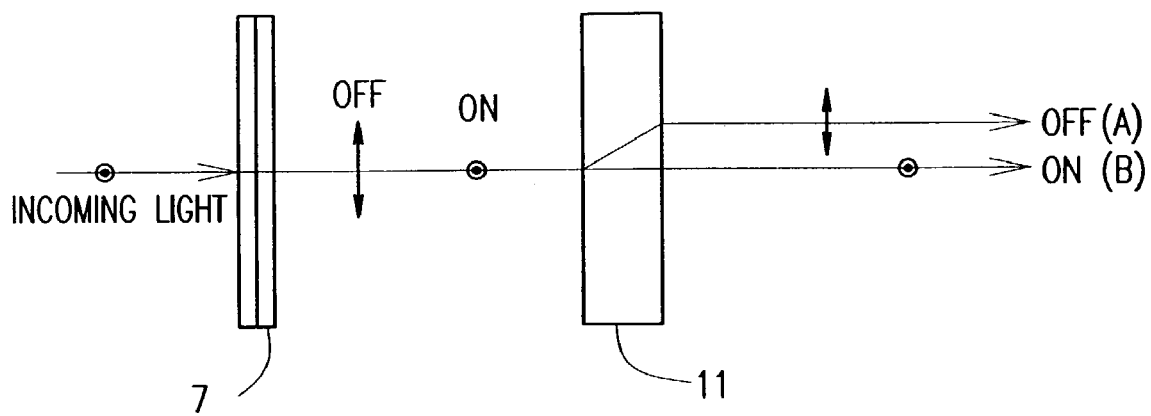
FIG. 1 schematically illustrates a conventional optical shifter including a liquid crystal cell and a birefringent element in combination.
Figure 2:
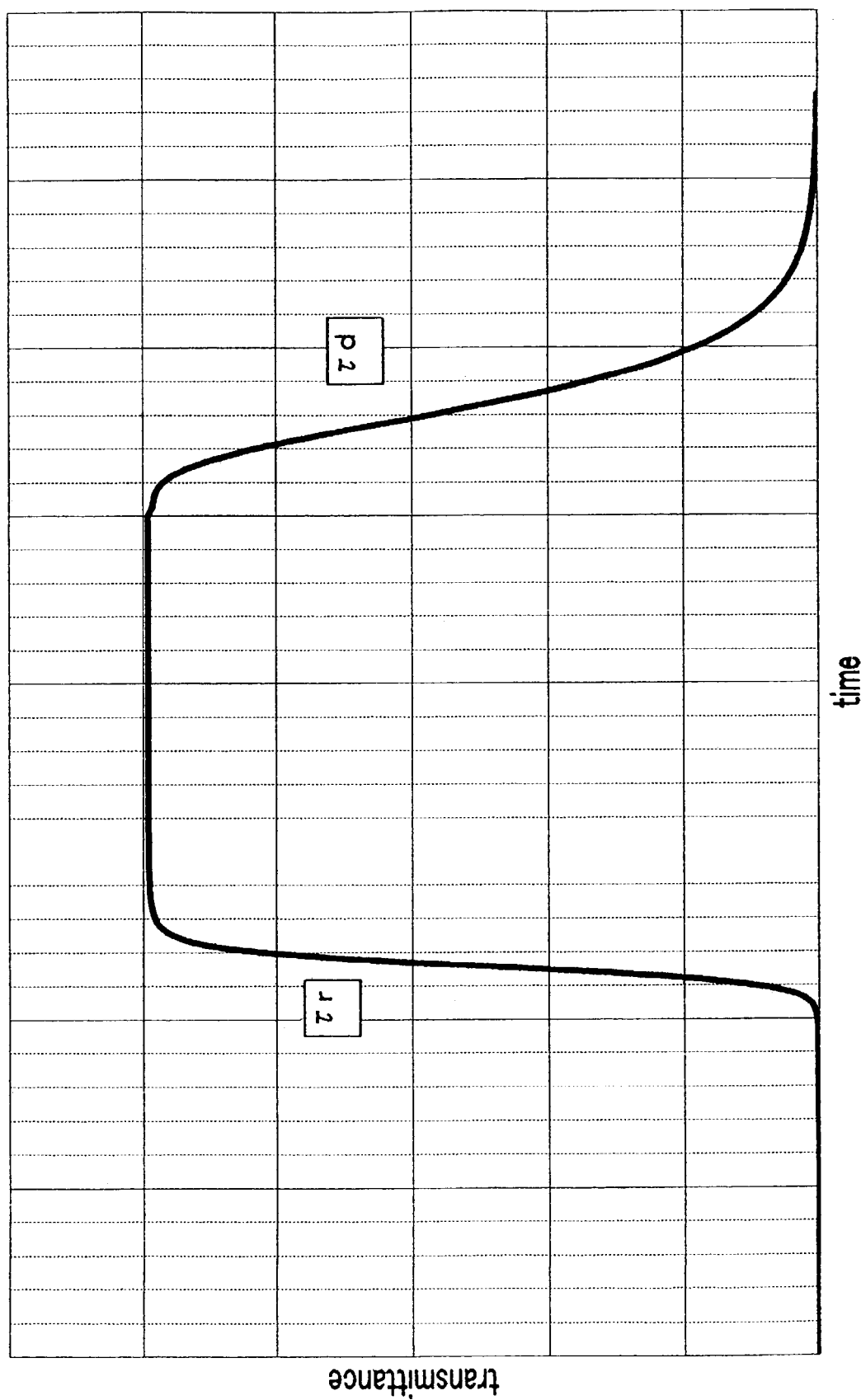
FIG. 2 is a graph showing how the transmittance of a liquid crystal layer changes with time (or applied voltage) when a pair of polarizers is disposed as parallel Nicols with a liquid crystal cell interposed between them.

In this comparative example, an optical shifter including a liquid crystal cell 7 and a birefringent element 11 as shown in FIG. 1 was used. The liquid crystal 7 was fabricated with a TN mode liquid crystal material and the liquid crystal layer thereof had a retardation of about 480 nm while no voltage was applied thereto. On one of the two substrates of the liquid crystal cell 7 on the light incoming side, the orientation direction of the liquid crystal molecules was substantially parallel to the polarization direction of the incoming linearly polarized light.

The percentages at which a ghost image was produced by the use of this optical shifter were estimated. The results are shown in the following Table 6:

TABLE 6

| Wavelength (nm) | Light reaching Location A | Light reaching Location B |
|---|---|---|
| 450 | about 95% | about 5% |
| 550 | about 100% | about 0% |
| 650 | about 95% | about 5% |

As can be seen from the results shown in Table 6, in the optical shifter including one TN mode liquid crystal cell 7, 5% of the incoming light with a wavelength of 450 nm reached the location B due to the wavelength dispersion of the liquid layer and a ghost image was produced. In the same way, 5% of the incoming light with a wavelength of 650 nm reached the location B to produce a ghost image, too. As a result, just an image having a low resolution could be obtained.

An optical shifter according to any of various preferred embodiments of the present invention described above can substantially eliminate a ghost image, which is often produced in the conventional optical display system due to the wavelength dispersion of its liquid crystal layer. Thus, an optical display system including an optical shifter according to a preferred embodiment of the present invention can display an image of quality with a significantly increased resolution.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An optical shifter comprising at least one shifting section that periodically displaces the optical axis of incoming linearly polarized light that has been incident on the shifting section, wherein the shifting section comprises:
   a first liquid crystal cell, which changes the polarization direction of the incoming light from a first direction into a second direction, or vice versa, the first and second directions being perpendicular to each other;
   a second liquid crystal cell, which changes the polarization direction of light that has been transmitted through the liquid crystal layer of the first liquid crystal cell from the first direction into the second direction, or vice versa;
   a birefringent element for transmitting the light that has been transmitted through the second liquid crystal cell, wherein there is no birefringent element between the first liquid crystal cell and the second liquid crystal cell, and the liquid crystal layer of the second liquid crystal cell compensates for a disturbance in polarization that was caused while the incoming linearly polarized light was transmitted through the liquid crystal layer of the first liquid crystal cell.

2. The optical shifter of claim 1, wherein the first and second liquid crystal cells are disposed such that a director in an intermediate portion of the liquid crystal layer of the first liquid crystal cell and a director in an intermediate portion of the liquid crystal layer of the second liquid crystal cell cross each other at right angles.

3. The optical shifter of claim 2, wherein the liquid crystal layers of the first and second liquid crystal cells are made of TN mode liquid crystal materials having mutually opposite optical rotatory directions.

4. The optical shifter of claim 2, wherein the liquid crystal layers of the first and second liquid crystal cells are made of ECB mode liquid crystal materials.

5. The optical shifter of claim 1, wherein an angle of 42 degrees to 45 degrees is defined between a director in an intermediate portion of the liquid crystal layer of the first liquid crystal cell and a director in an intermediate portion of the liquid crystal layer of the second liquid crystal cell, and
   wherein a bisector that divides the angle into two equal parts defines an angle of about 45 degrees with the polarization direction of the incoming light that enters the first liquid crystal cell.

6. The optical shifter of claim 5, wherein at least one of the two liquid crystal layers of the first and second liquid crystal cells is made of an ECB mode liquid crystal material.

7. The optical shifter of claim 6, wherein the at least one liquid crystal layer that is made of the ECB mode liquid crystal material has a retardation of 220 nm to 280 nm while no voltage is applied to the liquid crystal layer.

8. The optical shifter of claim 1, further comprising at least one more shifting section that has the same structure and function as the shifting section.

9. An optical shifter module comprising the optical shifter as recited in claim 1; and further comprising a driver circuit for applying first and second voltages to the first and second liquid crystal cells, respectively.

10. The optical shifter module of claim 9, wherein the driver circuit increases only one of the first and second voltages from a low level to a high level synchronously with a subfield switching.

11. The optical shifter module of claim 10, wherein the driver circuit increases both of the first and second voltages to the high level when subfields are switched and then decreases both of the first and second voltages into the low level during a subfield.

12. An optical display system comprising a display panel to display an image thereon; and the optical shifter as recited in claim 1,
   wherein light that has gone out of the display panel is shifted by the optical shifter while the image is being displayed on the display panel.

13. The optical display system of claim 12, further comprising a driver circuit for applying first and second voltages to the first and second liquid crystal cells, respectively.

14. The optical display system of claim 13, wherein the driver circuit increases only one of the first and second voltages from a low level to a high level.

15. The optical display system of claim 13, wherein the driver circuit increases both of the first and second voltages to the high level, and then decreases both of the voltages to the low level before the image displayed on the display panel is switched into another image.

16. The optical display system of claim 12, wherein the light that has gone out of the display panel and then enters the optical shifter is linearly polarized light.

17. The optical display system of claim 12, wherein when the image is shifted, each pixel of the image is divided into a predetermined number of color pixels by a time-division technique and then the color pixels are superimposed one upon the other time-sequentially.

18. An optical display system comprising:
- a light source that emits light;
- a display panel including multiple pixel regions, each of the pixel regions being able to modulate the light that has been incident thereon;
- light control means for converging the light, emitted from the light source, onto one of the multiple pixel regions that is associated with the wavelength of the light; and
- an optical system for forming an image on a projection plane by projecting the light that has been modulated by the display panel onto the plane,
- wherein the optical display system further comprises:
- a circuit for generating data representing multiple subframes from data representing a frame of the image and getting the multiple subframes displayed on the display panel one after another time-sequentially; and
- the optical shifter as recited in claim 1 for optically displacing, on the projection plane, selected ones of the multiple subframes being displayed on the display panel, and
- wherein the same area on the projection plane is sequentially irradiated with light rays that fall within mutually different wavelength ranges and that have been modulated by mutually different ones of the pixel regions of the display panel.

19. A method of driving the optical shifter as recited in claim 1, the method comprising the steps of:
- applying first and second voltages to the first and second liquid crystal cells, respectively;
- increasing only one of the first and second voltages from a low level to a high level at a time of a subfield switching;
- increasing only the other one of the first and second voltages from the low level to the high level at a time of another subfield switching; and
- decreasing both of the first and second voltages from the high level to the low level during a subfield.

20. An optical shifter comprising at least one shifting section that periodically displaces the optical axis of light incident on the shifting section, wherein the shifting section comprises:
- a first liquid crystal cell which changes the polarization direction of light from a first direction into a second direction, or vice versa, the first and second directions being perpendicular to each other;
- a second liquid crystal cell which changes the polarization direction of light that has been transmitted through the liquid crystal layer of the first liquid crystal cell from the first direction into the second direction, or vice versa;
- a birefringent element for transmitting the light that has been transmitted through the second liquid crystal cell; and
- wherein the first and second liquid crystal cells are disposed such that a director in an intermediate portion of the liquid crystal layer of the first liquid crystal cell and a director in an intermediate portion of the liquid crystal layer of the second liquid crystal cell cross each other at an angle when the first and second liquid crystal cells are in a common state, wherein the directors represent respective orientation directions of liquid crystal molecules in the intermediation portions of the first and second liquid crystal cells.

21. The optical shifter of claim 20, wherein the common state is an OFF state, and wherein the first and second liquid crystal cells are TN type cells.

22. The optical shifter of claim 20, wherein the angle is about 90 degrees.

23. The optical shifter of claim 20, wherein the first and second liquid crystal cells are TN or ECB type cells, and wherein the angle is 90 degrees.

24. The shifter of claim 1, wherein the first and second liquid crystal cells are disposed such that a director in an intermediate portion of the liquid crystal layer of the first liquid crystal cell and a director in an intermediate portion of the liquid crystal layer of the second liquid crystal cell cross each other at a right angle, wherein the directors represent respective orientation directions of liquid crystal molecules in the intermediation portions of the first and second liquid crystal cells.

* * * * *